(12) United States Patent
Kurokawa

(10) Patent No.: US 11,001,323 B2
(45) Date of Patent: May 11, 2021

(54) ELECTRIC SEATPOST ASSEMBLY

(71) Applicant: SHIMANO INC., Sakai (JP)

(72) Inventor: Yuta Kurokawa, Sakai (JP)

(73) Assignee: SHIMANO INC., Sakai (JP)

( * ) Notice: Subject to any disclaimer, the term of this patent is extended or adjusted under 35 U.S.C. 154(b) by 390 days.

(21) Appl. No.: 15/684,912

(22) Filed: Aug. 23, 2017

(65) Prior Publication Data

US 2019/0061851 A1  Feb. 28, 2019

(51) Int. Cl.
B62J 1/08 (2006.01)
B62K 19/36 (2006.01)
B62J 45/40 (2020.01)
B62J 1/00 (2006.01)

(52) U.S. Cl.
CPC .............. B62J 1/08 (2013.01); B62K 19/36 (2013.01); *B62J 1/00* (2013.01); *B62J 45/40* (2020.02); *B62J 2001/085* (2013.01)

(58) Field of Classification Search
CPC . B62J 1/00; B62J 1/08; B62J 2001/085; B62J 2099/002; B62K 19/36
See application file for complete search history.

(56) References Cited

U.S. PATENT DOCUMENTS

| 7,267,637 B2* | 9/2007 | Mercado | A63B 21/00181 482/52 |
| 9,511,809 B2 | 12/2016 | Kodama et al. | |
| 9,676,441 B2* | 6/2017 | Chen | B62K 25/04 |
| 10,358,180 B2* | 7/2019 | Shipman | B62J 1/08 |
| 2005/0245358 A1* | 11/2005 | Mercado | A63B 21/00181 482/52 |
| 2014/0345411 A1* | 11/2014 | Miki | B62M 25/08 74/473.12 |
| 2015/0130153 A1* | 5/2015 | Chen | B62K 25/04 280/124.108 |
| 2015/0197308 A1 | 7/2015 | Butora et al. | |
| 2017/0096184 A1 | 4/2017 | Hara et al. | |
| 2017/0341705 A1 | 11/2017 | Tsuchizawa et al. | |
| 2018/0186419 A1* | 7/2018 | Shipman | B62J 1/08 |

FOREIGN PATENT DOCUMENTS

| DE | 102009010170 | 8/2010 |
| DE | 102016010857 | 4/2017 |
| DE | 102017208291 | 11/2017 |

* cited by examiner

Primary Examiner — Frederick M Brushaber
(74) Attorney, Agent, or Firm — Mori & Ward, LLP

(57) ABSTRACT

An electric seatpost assembly comprises a first member, a second member, a positioning structure, a controller, and a switch unit. The second member is movably coupled to the first member so as to change a length of the electric seat post assembly. The positioning structure is configured to position the second member relative to the first member. The controller is to control the positioning structure. The switch unit is provided on one of the first member and the second member to transmit at least one electric signal to the controller.

17 Claims, 17 Drawing Sheets

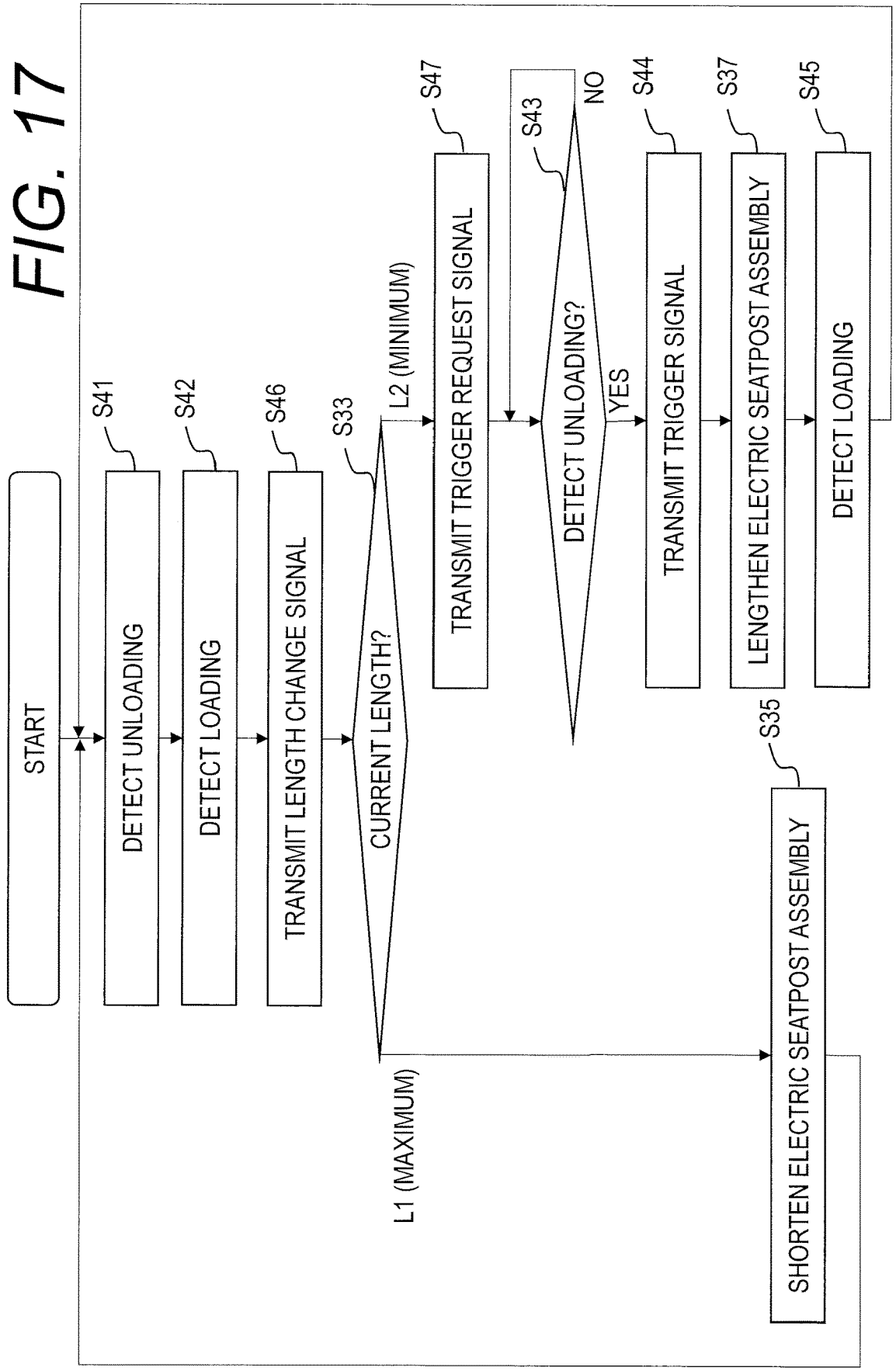

ELECTRIC SEATPOST ASSEMBLY

BACKGROUND OF THE INVENTION

Field of the Invention

The present invention relates to an electric seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electric seatpost assembly.

SUMMARY OF THE INVENTION

In accordance with a first aspect of the present invention, an electric seatpost assembly comprises a first member, a second member, a positioning structure, a controller, and a switch unit. The second member is movably coupled to the first member so as to change a length of the electric seat post assembly. The positioning structure is configured to position the second member relative to the first member. The controller is to control the positioning structure. The switch unit is provided on one of the first member and the second member to transmit at least one electric signal to the controller.

With the electric seatpost assembly according to the first aspect, it is possible to change the length of the electric seatpost assembly without a remote switch adjacent to a bicycle handle. Accordingly, it is possible to simplify wiring between the switch unit and the controller and/or to reduce the number of parts of the electric seatpost assembly.

In accordance with a second aspect of the present invention, the electric seatpost assembly according to the first aspect is configured so that the switch unit includes a push button or a lever.

With the electric seatpost assembly according to the second aspect, it is possible to manually change the length of the electric seatpost assembly.

In accordance with a third aspect of the present invention, the electric seatpost assembly according to the first aspect is configured so that the switch unit is at least partly disposed at a front side of the electric seatpost assembly in a state where the electric seatpost assembly is mounted to a bicycle frame.

With the electric seatpost assembly according to the third aspect, it is possible to dispose the switch unit at a position where the rider can easily manipulate the switch unit.

In accordance with a fourth aspect of the present invention, the electric seatpost assembly according to the third aspect is configured so that the switch unit includes an operating member extending forward.

With the electric seatpost assembly according to the fourth aspect, it is possible to dispose the switch unit at a position where the rider can easily manipulate the switch unit.

In accordance with a fifth aspect of the present invention, the electric seatpost assembly according to the fourth aspect is configured so that the operating member is upward movable.

With the electric seatpost assembly according to the fifth aspect, it is possible to easily manipulate the operating member.

In accordance with a sixth aspect of the present invention, the electric seatpost assembly according to the fourth or fifth aspect is configured so that the operating member is movable in a first direction and a second direction different from the first direction.

With the electric seatpost assembly according to the sixth aspect, it is possible to use the first direction and the second direction for at least one operation.

In accordance with a seventh aspect of the present invention, the electric seatpost assembly according to the sixth aspect is configured so that the controller controls the positioning structure with a same manner in response to both a first operation where the operating member is moved in the first direction and a second operation where the operating member is moved in the second direction.

With the electric seatpost assembly according to the seventh aspect, it is possible to use the first direction and the second direction according to a rider's preference.

In accordance with an eighth aspect of the present invention, the electric seatpost assembly according to the sixth aspect is configured so that the controller controls the positioning structure with different manners in response to a first operation where the operating member is moved in the first direction and a second operation where the operating member is moved in the second direction.

With the electric seatpost assembly according to the eighth aspect, it is possible to perform different controls with one operating member.

In accordance with a ninth aspect of the present invention, the electric seatpost assembly according to the eighth aspect is configured so that the controller is configured to lengthen the length of the electric seatpost assembly in response to the first operation. The controller is configured to shorten the length of the electric seatpost assembly in response to the second operation.

With the electric seatpost assembly according to the ninth aspect, it is possible to lengthen and shorten the electric seatpost assembly with one operating member. Further, it is possible to correspond the first direction and the second direction to an upward direction and a downward direction, respectively. That is, it is possible to correspond operation direction of the operating member to extending and shrinking direction of the electric seatpost assembly.

In accordance with a tenth aspect of the present invention, the electric seatpost assembly according to the eighth aspect is configured so that the controller is configured to actuate the positioning structure for a first time period in response to the first operation. The controller is configured to actuate the positioning structure for a second time period in response to the second operation. The second time period is different from the first time period.

With the electric seatpost assembly according to the tenth aspect, it is possible to select a change of a length of the seatpost assembly in one operation based on a time period in which the positioning structure is actuated.

In accordance with an eleventh aspect of the present invention, the electric seatpost assembly according to the eighth aspect is configured so that the positioning structure includes an actuator to change a relative position between the first member and the second member. The controller is configured to control the positioning structure to move the actuator for a first amount in response to the first operation. The controller is configured to control the positioning structure to move the actuator for a second amount different from the first amount in response to the second operation.

With the electric seatpost assembly according to the eleventh aspect, it is possible to change a moving amount of the actuator (e.g. a valve opening area) to change a velocity of the movement of the second member based on the moving amount of the actuator.

In accordance with a twelfth aspect of the present invention, the electric seatpost assembly according to any one of the first to eleventh aspects is configured so that the switch unit is configured to continuously transmit the at least one electric signal while the switch unit is operated.

With the electric seatpost assembly according to the twelfth aspect, it is possible for a rider to set the length of the electric seatpost assembly by stopping operation of the switch unit.

In accordance with a thirteenth aspect of the present invention, the electric seatpost assembly according to any one of the first to eleventh aspects is configured so that the switch unit is configured to transmit the at least one electric signal for a predetermined transmission time period per one operation of the switch unit.

With the electric seatpost assembly according to the thirteenth aspect, it is possible for a rider to operate the switch unit in a short amount of time. Accordingly, it is possible to finish the operation of the switch unit before the electric seatpost assembly finishes changing its length in accordance with the operation of the switch unit.

In accordance with a fourteenth aspect of the present invention, the electric seatpost assembly according to any one of the first to thirteenth aspects is configured so that the positioning structure includes an actuator to change a relative position between the first member and the second member. The controller is configured to control the positioning structure to move the actuator for a predetermined actuation time period in response to the at least one electric signal transmitted per one operation of the switch unit.

With the electric seatpost assembly according to the fourteenth aspect, it is possible for a rider to operate the switch unit in a short amount of time. Accordingly, it is possible to finish the operation of the switch unit before the electric seatpost assembly finishes changing its length in accordance with the operation of the switch unit.

In accordance with a fifteenth aspect of the present invention, the electric seatpost assembly according to any one of the first to fourteenth aspects is configured so that the switch unit includes an operating member movable between a rest position and an operated position. The operating member is biased to the rest position.

With the electric seatpost assembly according to the fifteenth aspect, it is possible for a rider to manipulate the switch unit easily, because the switch unit is positioned in a stabilized position when the rider starts operating the switch unit.

In accordance with a sixteenth aspect of the present invention, the electric seatpost assembly according to any one of the first to fifteenth aspects is configured so that the switch unit includes a seating detector to detect a ride on the second member.

With the electric seatpost assembly according to the sixteenth aspect, it is possible to control the length of the electric seatpost assembly in accordance with information of the ride.

In accordance with a seventeenth aspect of the present invention, the electric seatpost assembly according to the sixteenth aspect is configured so that the seating detector is configured to detect a riding posture on the second member to transmit the at least one electric signal. The controller is configured to control the positioning structure in response to the at least one electric signal.

With the electric seatpost assembly according to the seventeenth aspect, it is possible for a rider to change the length of the electric seatpost assembly by changing the riding posture in accordance with pedalling situation.

In accordance with an eighteen aspect of the present invention, the electric seatpost assembly according to the seventeenth aspect is configured so that the at least one electric signal includes an extension signal to lengthen the length of the electric seatpost assembly. The seating detector is configured to transmit the extension signal to the controller in response to detection of a first riding posture.

With the electric seatpost assembly according to the eighteenth aspect, it is possible for a rider to lengthen the length of the electric seatpost assembly by riding the bicycle in the first riding posture.

In accordance with a nineteenth aspect of the present invention, the electric seatpost assembly according to the eighteenth aspect is configured so that the at least one electric signal includes a trigger signal. The seating detector is configured to transmit the trigger signal to the controller in response to detection of unloading onto the second member. The controller is configured to control the positioning structure to lengthen the length of the electric seatpost assembly in response to the trigger signal after receiving the extension signal.

With the electric seatpost assembly according to the nineteenth aspect, it is possible to smoothly lengthen the electric seatpost assembly, because it is possible to start lengthening the electric seatpost assembly by unloading onto the second member.

In accordance with a twentieth aspect of the present invention, the electric seatpost assembly according to the nineteenth aspect is configured so that the at least one electric signal includes a canceling signal. The seating detector is configured to transmit the canceling signal to the controller in response to detection of a second riding posture that is different from the first riding posture. The controller is configured to cancel a command based on the extension signal in response to the canceling signal before receiving the trigger signal.

With the electric seatpost assembly according to the twentieth aspect, it is possible to prevent the electric seatpost assembly from being lengthened when the riding posture is changed.

In accordance with a twenty-first aspect of the present invention, the electric seatpost assembly according to any one of the seventeenth to twentieth aspects is configured so that the at least one electric signal includes a retraction signal to shorten the length of the electric seatpost assembly. The seating detector is configured to transmit the retraction signal to the controller in response to detection of a third riding posture.

With the electric seatpost assembly according to the twenty-first aspect, it is possible for a rider to shorten the length of the electric seatpost assembly by riding the bicycle in the second riding posture.

In accordance with a twenty-second aspect of the present invention, the electric seatpost assembly according to the sixteenth aspect is configured so that the at least one electric signal includes an extension signal to lengthen the length of the electric seatpost assembly. The seating detector is configured to transmit the extension signal to the controller in response to detection of one of loading and unloading onto the second member.

With the electric seatpost assembly according to the twenty-second aspect, it is possible to control the length of the electric seatpost assembly in the relatively simple manner among manners in which the length of the electric seatpost assembly is controlled based on a riding posture.

In accordance with a twenty-third aspect of the present invention, the electric seatpost assembly according to the twenty-second aspect is configured so that the controller is configured to control the positioning structure to lengthen the length of the electric seatpost assembly in response to the extension signal in a state where the seating detector detects the unloading.

With the electric seatpost assembly according to the twenty-third aspect, it is possible to prevent the electric seatpost assembly from being lengthened with a load applied to the electric seatpost assembly. Accordingly, it is possible to decrease the load of the actuator.

In accordance with a twenty-fourth aspect of the present invention, the electric seatpost assembly according to the sixteenth aspect is configured so that the at least one electric signal includes a retraction signal to shorten the length of the electric seatpost assembly. The seating detector is configured to transmit the retraction signal to the controller in response to detection of one of loading and unloading onto the second member. The controller is configured to control the positioning structure to shorten the length of the electric seatpost assembly in response to the retraction signal.

With the electric seatpost assembly according to the twenty-fourth aspect, it is possible to control the length of the electric seatpost assembly in the relatively simple manner among manners in which the length of the electric seatpost assembly is controlled based on a riding posture.

In accordance with a twenty-fifth aspect of the present invention, the electric seatpost assembly according to any one of the first to twenty-fourth aspects is configured so that the positioning structure is configured to position the second member relative to the first member such that a predetermined first length and a predetermined second length different from the first length are realized as the length of the electric seat post assembly.

With the electric seatpost assembly according to the twenty-fifth aspect, it is possible to change the length of the electric seatpost assembly among the two lengths. Accordingly, it is possible to use only one type of the electric signal to change the length of the electric seatpost assembly.

In accordance with a twenty-sixth aspect of the present invention, the electric seatpost assembly according to any one of the first to twenty-fifth aspects is configured so that the switch unit is configured to provide a click feeling when the switch unit is operated.

With the electric seatpost assembly according to the twenty-sixth aspect, the rider can easily recognize the operation of the electric seatpost assembly.

In accordance with a twenty-seventh aspect of the present invention, the electric seatpost assembly according to any one of the first to twenty-sixth aspects is configured so that the first member includes a first tube. The second member includes a second tube configured to be telescopically coupled to the first tube.

With the electric seatpost assembly according to the twenty-seventh aspect, it is possible to change the length of the electric seatpost assembly without a remote switch adjacent to a bicycle handle. Accordingly, it is possible to simplify wiring between the switch unit and the controller and/or to reduce the number of parts of the electric seatpost assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 17 illustrates a flow chart showing processes in a modification of the second algorithm in the second method executed by the controller with the third embodiment.

DESCRIPTION OF THE EMBODIMENTS

Figure 1:
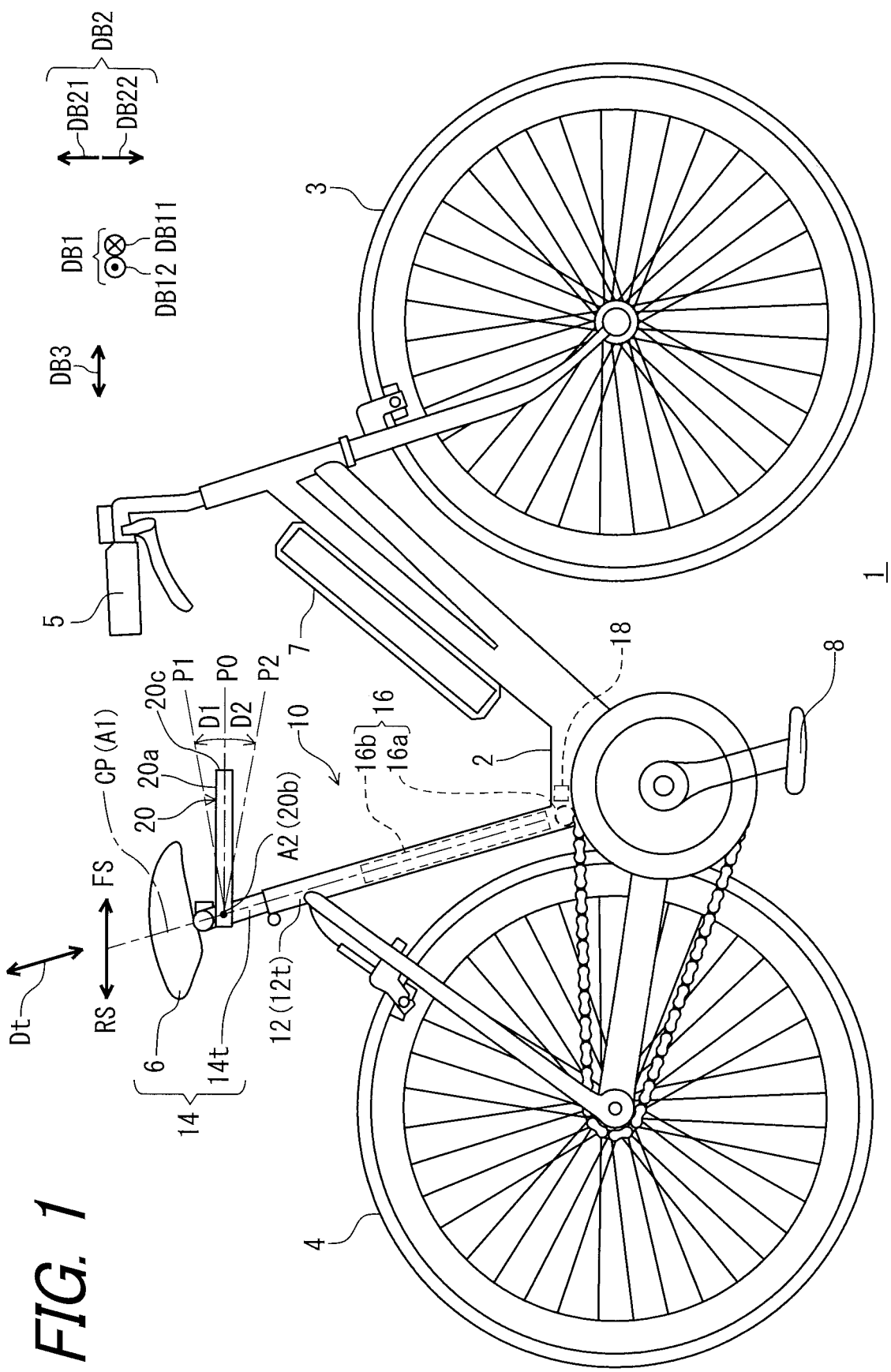
FIG. 1 is a schematic diagram of a bicycle in a first embodiment.

The embodiments will now be described with reference to the accompanying drawings, wherein like reference numerals designate corresponding or identical elements throughout the various drawings.

First Embodiment

FIG. 1 shows one example of a bicycle 1 including an electric seatpost assembly 10. The bicycle 1 includes a bicycle frame 2, two rotatable wheels (a front wheel 3 and a rear wheel 4) coupled to the bicycle frame 2, a handlebar 5 to turn the front wheel 3, a seat 6, a battery 7, and the electric seatpost assembly 10.

In the present application, the following directional terms "front", "rear", "forward", "rearward", "left", "right", "transverse", "upward" and "downward" as well as any other similar directional terms refer to those directions which are determined on the basis of a rider who sits on the seat 6 of the bicycle 1 with facing the handlebar 5. Accordingly, these terms, as utilized to describe the electric seatpost assembly 10, should be interpreted relative to the bicycle 1 equipped with the electric seatpost assembly 10 as used in an upright riding position on a horizontal surface.

Figure 2:
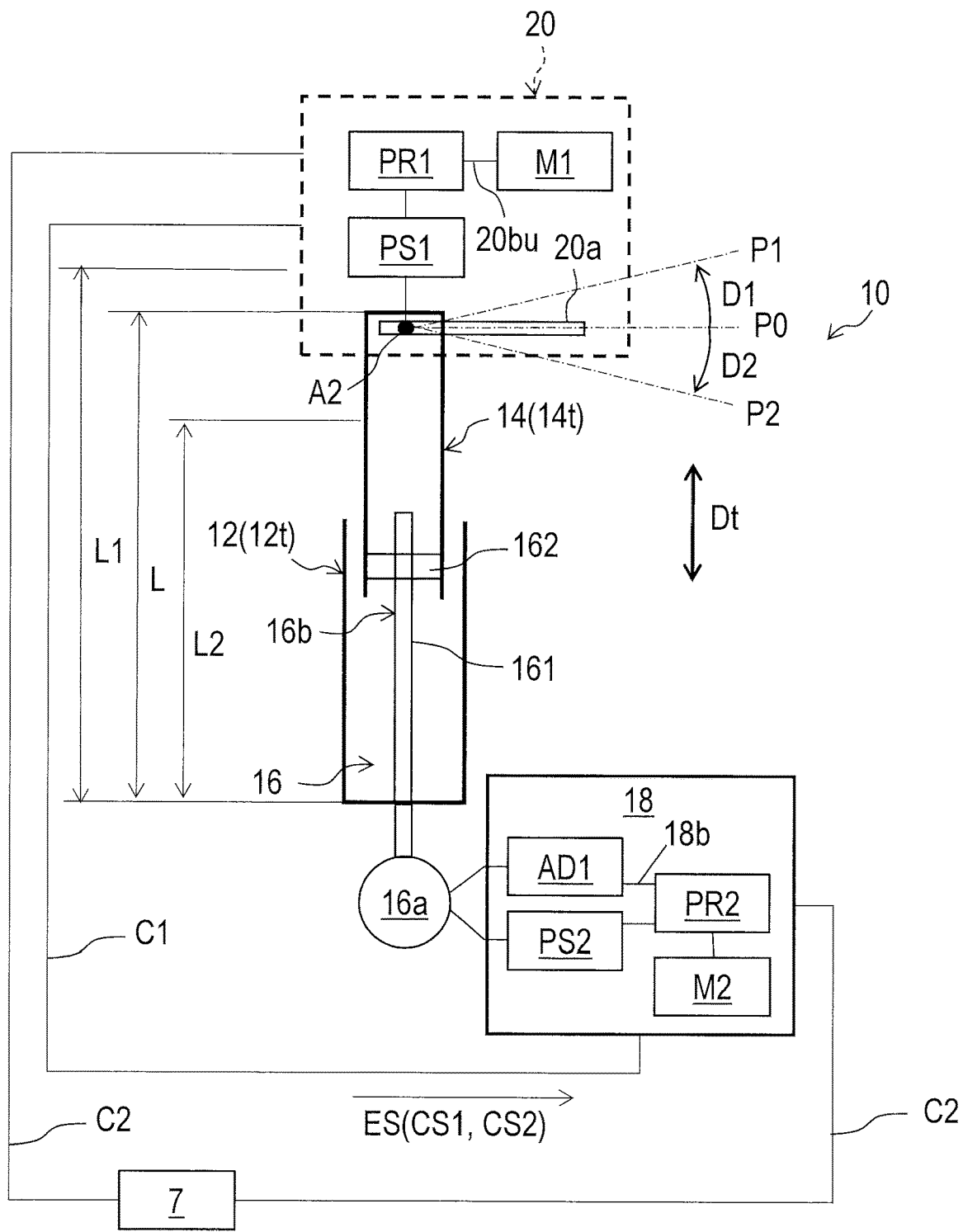
FIG. 2 is a schematic block diagram of an electric seatpost assembly in accordance with the first embodiment.

As seen in FIG. 2, the electric seatpost assembly 10 comprises a first member 12, a second member 14, a positioning structure 16, a controller 18, and a switch unit 20. The second member 14 is movably coupled to the first member 12 so as to change a length L of the electric seatpost assembly 10. The length L of the electric seatpost assembly 10 is changed between a maximum length L1 and a minimum length L2. The first member 12 includes a first tube 12t. The second member 14 includes a second tube 14t configured to be telescopically coupled to the first tube 12t. The first tube 12t and the second tube 14t extend in a telescopic direction Dt. The second member 14 can include the seat 6. The positioning structure 16 is configured to position the second member 14 relative to the first member 12. The positioning structure 16 includes an actuator 16a to change a relative position between the first member 12 and the second member 14.

In this embodiment, the actuator 16a includes a direct current (DC) motor. The actuator 16a includes a rotational shaft (not shown) to output a rotational force. Other examples of the actuator 16a include a stepper motor, an alternating current (AC) motor, and an electromagnetic solenoid. The positioning structure 16 includes a linear motion conversion mechanism 16b to convert rotation of the motor to a linear movement in the telescopic direction Dt. The actuator 16a is attached to one of the first member 12 and the second member 14. In the illustrated embodiment, the actuator 16a is attached to the first member 12, but the actuator 16a can be attached to the second member 14. The rotational shaft of the actuator 16a is coupled to the linear motion conversion mechanism 16b via a gear reducer (not shown). The linear motion conversion mechanism 16b is connected to the other of the first member 12 and the second member 14.

As seen in FIG. 2, the linear motion conversion mechanism 16b includes a ball screw 161 to be rotated by the motor and a female screw 162 engaged with the ball screw and attached to the other of the first member 12 and the second member 14 to move the other of the first member 12 and the second member 14 in the telescopic direction Dt in accordance with the rotation of the ball screw 161. However, the linear motion conversion mechanism 16b can include a pinion to be rotated by the actuator 16a and a rack engaged with the pinion and attached to the other of the first member 12 and the second member 14 to move the other of the first member 12 and the second member 14 in the telescopic direction Dt in accordance with the rotation of the pinion. If the actuator 16a is an electromagnetic solenoid, the linear motion conversion mechanism 16b can be a rod movable in the telescopic direction Dt.

The controller 18 is to control the positioning structure 16. More specifically, the controller 18 is configured to control the positioning structure 16 based on a rider's operation of the switch unit 20. The detailed feature of the controller 18 is described below. The switch unit 20 is provided on one of the first member 12 and the second member 14 to transmit at least one electric signal ES to the controller 18. Preferably, the switch unit 20 is provided on the second member 14 which is closer to the rider. The switch unit 20 is configured to transmit the at least one electric signal ES based on the rider's operation of the switch unit 20. The switch unit 20 is configured to transmit the at least one electric signal ES to the controller 18 via a control cable C1. However, the switch unit 20 can transmit the at least one electric signal ES to the controller 18 via wireless communication. The switch unit 20 includes a push button or a lever. In the illustrated embodiment, the switch unit 20 is illustrated as a lever connected to the second tube 14t.

As seen in FIG. 1, the switch unit 20 is at least partly disposed at a front side FS of the electric seatpost assembly 10 in a state where the electric seatpost assembly 10 is mounted to the bicycle frame 2. The front side FS is a side defined in front of a center plane CP of the electric seatpost assembly 10. The center plane CP is parallel to the center axis A1 of the first tube 12t and the second tube 14t and extends in a lateral direction DB1 of the bicycle 1. More specifically, the switch unit 20 includes an operating member 20a. For example, the operating member 20a includes a lever. The operating member 20a is a part of the switch unit 20 which the rider manipulates during operation. The operating member 20a is pivotable about a pivot axis A2. The operating member 20a includes a proximal portion 20b including the pivot axis A2 and a distal portion 20c opposite to the proximal portion 20b. The distal portion 20c is disposed at the front side FS of the electric seatpost assembly 10 in the state where the electric seatpost assembly 10 is mounted to the bicycle frame 2. Accordingly, the operating member 20a extends forward.

The operating member 20a is movable in a first direction D1 and a second direction D2 different from the first direction D1. More specifically, the operating member 20a is movable in the first direction D1 and the second direction D2 about the pivot axis A2. In the illustrated embodiment, the first direction D1 corresponds to an upward direction DB21 of the bicycle 1. The second direction D2 corresponds to a downward direction DB22 of the bicycle 1. The pivot axis A2 extends in the lateral direction DB1 of the bicycle 1. Accordingly, the operating member 20a is upward movable. In other words, the operating member 20a is movable toward the seat 6. However, the first and second directions D1 and D2 can be different directions from the upward and downward directions DB21 and DB22, respectively. For example, the first direction D1 can be a leftward direction DB11, the second direction D2 can be a rightward direction DB12, and the pivot axis A2 extends in a vertical direction DB2 of the bicycle 1.

The operating member 20a is movable between a rest position P0 and an operated position (e.g. P1 and P2). The operating member 20a is biased to the rest position P0. For example, the operating member 20a includes a helical torsion spring around the pivot axis A2 which is not illustrated in the drawings. The operating member 20a is biased to the rest position P0 due to restoring force of the helical torsion spring.

As seen in FIG. 2, the switch unit 20 includes a processor PR1, a memory M1, and a rotation sensor PS1. The processor PR1, the memory M1, and the rotation sensor PS1 are connected with each other via a bus 20bu. Preferably, the processor PR1, the memory M1, the rotation sensor PS1, and the bus 20bu are disposed in the second member 14. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the switch unit 20 are performed. The rotation sensor PS1 can include a potentiometer, and a non-contact rotational position sensor such as an optical sensor (e.g., a rotary encoder) and a magnetic sensor (e.g., a hall sensor). The rotation sensor PS1 is configured to detect a rotation angle or a rotation position of the operating member 20a. The processor PR1 generates an electric signal ES based on the rotation angle or the rotation position of the operating member 20a to transmit the electric signal ES to the controller 18.

As seen in FIG. 2, the controller 18 includes a processor PR2, a memory M2, a position sensor PS2, and an actuator driver AD1. The actuator 16a, the position sensor PS2, the actuator driver AD1, the processor PR2, and the memory M2 are connected with each other via a bus 18b. The processor PR2 is electrically connected to the memory M2. The processor PR2 includes a central processing unit (CPU). The memory M2 stores programs and other information. The memory M2 includes a read only memory (ROM), a random access memory (RAM), and a memory controller. For example, a program stored in the memory M2 is read into the processor PR2, and thereby several functions of the controller 18 are performed.

To determine a current state of the positioning structure 16, the position sensor PS2 senses a current rotational position of the rotational shaft of the actuator 16a as a position of the second member 14. Examples of the position sensor PS2 include a contact rotational position sensor such as a potentiometer, and a non-contact rotational position sensor such as an optical sensor (e.g., a rotary encoder) and a magnetic sensor (e.g., a hall sensor). The current rotational position of the actuator 16a is stored in the memory M2. The processor PR2 generates a control signal based on a signal from the switch unit 20 and the current rotational position of the actuator 16a.

The actuator driver AD1 is configured to control the actuator 16a based on the control signal generated by the processor PR2. In this embodiment, the actuator driver AD1 controls a rotational direction and/or a rotational speed of the actuator 16a based on the control signal generated by the processor PR2. The battery 7 is configured to provide electric power to the controller 18 and the switch unit 20 via power lines C2.

The controller 18 controls the positioning structure 16 with different manners in response to a first operation where the operating member 20a is moved in the first direction D1 and a second operation where the operating member 20a is moved in the second direction D2. More specifically, the controller 18 is configured to lengthen the length L of the electric seatpost assembly 10 in response to the first operation. The controller 18 is configured to shorten the length L of the electric seatpost assembly 10 in response to the second operation. For example, when the operating member 20a is moved in the first direction D1, the switch unit 20 transmit an extension signal CS1 to the controller 18, the controller 18 controls the actuator 16a to lengthen the length L of the electric seatpost assembly 10 in response to the extension signal CS1. When the operating member 20a is moved in the second direction D2, the switch unit 20 transmit a retraction signal CS2 to the controller 18, the controller 18 controls the actuator 16a to shorten the length L of the electric seatpost assembly 10 in response to the retraction signal CS2.

In this case, the switch unit 20 is configured to continuously transmit the at least one electric signal ES while the switch unit 20 is operated. For example, the switch unit 20 is configured to continuously transmit the extension signal CS1 while the operating member 20a is positioned at the operated position P1, and the controller 18 continuously controls the actuator 16a to lengthen the length L of the electric seatpost assembly 10 while the controller 18 receives the extension signal CS1. The switch unit 20 is configured to continuously transmit the retraction signal CS2 while the operating member 20a is positioned at the operated position P2, and the controller 18 continuously controls the actuator 16a to shorten the length L of the electric seatpost assembly 10 while the controller 18 receives the retraction signal CS2.

Alternatively, the switch unit 20 is configured to transmit the at least one electric signal ES for a predetermined transmission time period per one operation of the switch unit 20. For example, the switch unit 20 is configured to transmit the extension signal CS1 for a predetermined transmission time period when the operating member 20a is moved in the first direction D1 or the operating member 20a reaches the operated position P1 regardless of a time to maintain the operating member 20a at the operated position P1. The controller 18 controls the actuator 16a to lengthen the length L of the electric seatpost assembly 10 to a predetermined height corresponding to the extension signal CS1. The switch unit 20 is configured to transmit the retraction signal CS2 for the predetermined transmission time period when the operating member 20a is moved in the second direction D2 or the operating member 20a reaches the operated position P2 regardless of a time to maintain the operating member 20a at the operated position P2. The controller 18 continuously controls the actuator 16a to shorten the length L of the electric seatpost assembly 10 to a predetermined height corresponding to the retraction signal CS2.

In the above examples, the controller 18 is configured to continuously control the positioning structure 16 while the controller 18 receives the at least one electric signal ES from the switch unit 20. However, the controller 18 can be configured to control the positioning structure 16 to move the actuator 16a for a predetermined actuation time period in response to the at least one electric signal ES transmitted per one operation of the switch unit 20. For example, the controller 18 controls the actuator 16a to lengthen the length L of the electric seatpost assembly 10 for a predetermined actuation time period once the controller 18 receives the extension signal CS1 regardless of a time length while the controller 18 receives the extension signal CS1. The controller 18 controls the actuator 16a to shorten the length L of the electric seatpost assembly 10 for a predetermined actuation time period once the controller 18 receives the retraction signal CS2 regardless of a time length while the controller 18 receives the retraction signal CS2. The predetermined actuation time period can be set in advance or included in the extension signal CS1 and the retraction signal CS2. In this case, the controller 18 is configured to control the positioning structure 16 to move the actuator 16a for a first amount in response to the first operation. The controller 18 is configured to control the positioning structure 16 to move the actuator 16a for a second amount different from the first amount in response to the second operation. Specifically, the second amount is an additive inverse of the first amount.

With the electric seatpost assembly 10, it is possible to change the length L of the electric seatpost assembly 10 without a remote switch adjacent to the handlebar 5. Accordingly, it is possible to simplify wiring between the switch unit 20 and the controller 18 and/or to reduce the number of parts of the electric seatpost assembly 10.

Modifications of First Embodiment

In the first embodiment, the positioning structure 16 is configured to change the length L of the electric seatpost assembly 10 between the maximum length L1 and the minimum length L2. However, the positioning structure 16 can be configured to position the second member 14 relative to the first member 12 such that the predetermined first length L1 and the predetermined second length L2 different from the first length L1 are realized as the length L of the electric seatpost assembly 10. This means, the length L of the electric seatpost assembly 10 is controlled to be only the predetermined first length L1 or the predetermined second length L2. The positioning structure 16 is not controlled to set the length L of the electric seatpost assembly 10 which is longer than the predetermined second length L2 and shorter than the predetermined first length L1. In this case, the operating member 20a can be movable only in the first direction D1, and the first direction D1 may not be the upward direction DB21. The controller 18 is configured to lengthen or shorten the length L of the electric seatpost assembly 10 based on the current length of the electric seatpost assembly 10 in response to the first operation. For example, when the current length of the electric seatpost assembly 10 is the maximum length L1, the controller 18 shortens the length L of the electric seatpost assembly 10 to be the minimum length L2 in response to the first operation. When the current length of the electric seatpost assembly 10 is the minimum length L2, the controller 18 lengthens the length L of the electric seatpost assembly 10 to be the maximum length L1 in response to the first operation.

Figure 3:
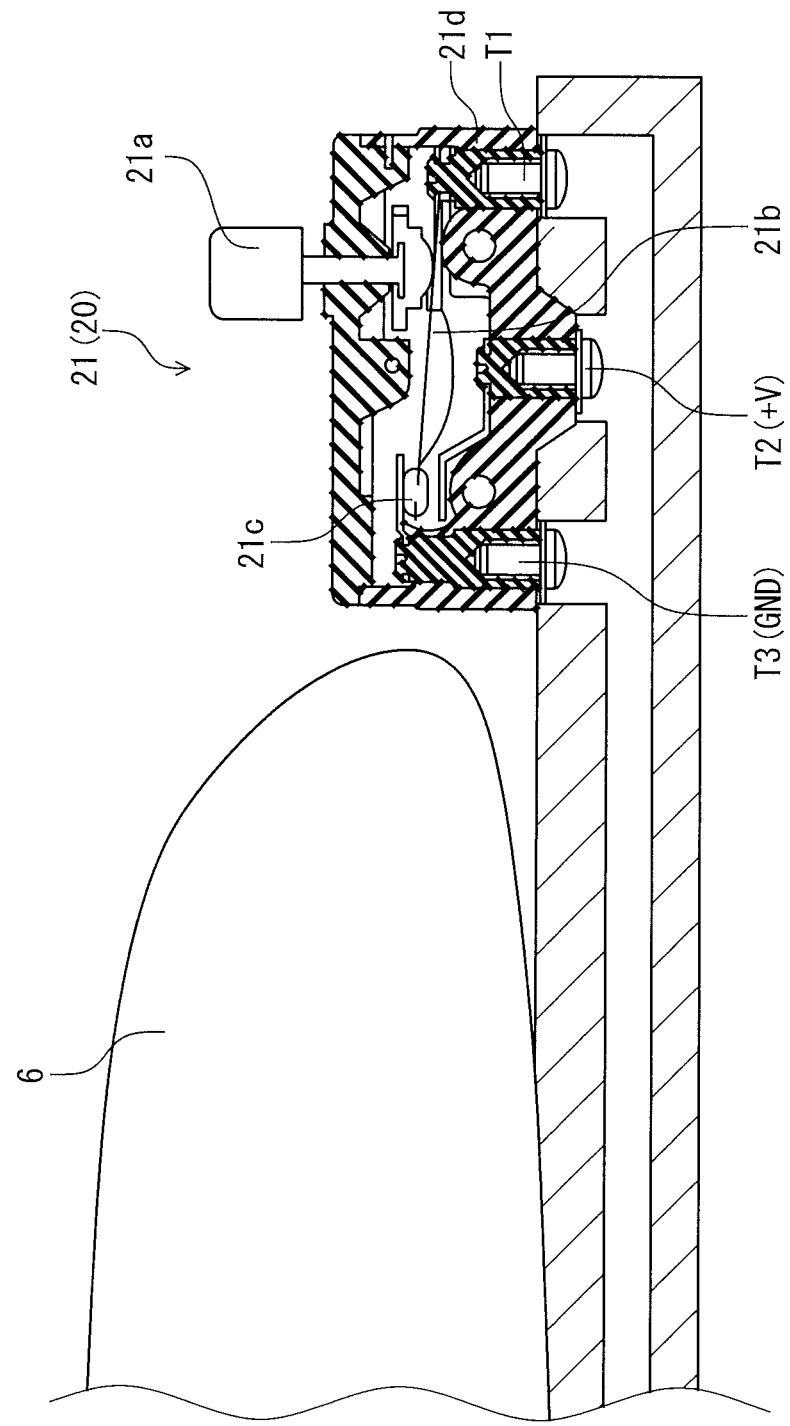
FIG. 3 shows another example of a switch unit illustrated in FIG. 1.

In the first embodiment, the switch unit 20 is illustrated as a lever. However, the switch unit 20 may be a push button. In FIG. 3, the push button 21 as another example of the switch unit 20 is illustrated. The push button 21 is disposed at the front side FS of the electric seatpost assembly 10 in the state where the electric seatpost assembly 10 is mounted to the bicycle frame 2. More specifically, the push button 21 is disposed in front of the seat 6. Alternatively, the push button 21 can be disposed vertically below the seat 6 in the state where the electric seatpost assembly 10 is mounted to the bicycle frame 2. More specifically, the push button 21 is disposed in front of the seat 6. The push button 21 has substantially the same structure as a microswitch, for example. Specifically, the push button 21 includes a first terminal T1, a second terminal T2, a third terminal T3, an operating member 21a, an electrically conductive plate spring 21b, a contact 21c, and a housing 21d. The first terminal is connected to the control cable C1. The second terminal T2 is connected to the battery 7. A voltage (+V) is supplied to the second terminal T2 from the battery 7. The third terminal T3 is grounded. The operating member 21a is pushed by the rider during operation of the electric seatpost assembly 10. The electrically conductive plate spring 21b is electrically connected to the first terminal T1 and the contact 21c. The housing 21d is made of an insulating member and electrically insulates the first terminal T1, the second terminal T2, the third terminal T3 from each other. When the operating member 21a is not pushed, the electrically conductive plate spring 21b is configured to connect the contact 21c and the third terminal T3. When the operating member 21a is pushed, the electrically conductive plate spring 21b is configured to connect the contact 21c and the second terminal T2 to transmit the voltage to the controller 18 via the control cable C1 as the at least one electric signal ES. Since the switch unit 20 has such structure, the switch unit 20 is configured to provide a click feeling when the switch unit 20 is operated. Accordingly, the rider can easily recognize the operation of the electric seatpost assembly 10.

Further, the switch unit 20 can have simpler structure. For example, the switch unit 20 can have substantially the same structure as that of a toggle switch (a two output toggle switch or a three output toggle switch). Since the structure of toggle switch has been well known, it will not be described and/or illustrated in detail here for the sake of brevity. In this case, an ON signal from the switch unit 20 can correspond to at least one of the extension signal CS1 and the retraction signal CS2. In case where the switch unit 20 has substantially the same structure as that of a three output toggle switch, the electric seatpost assembly 10 can have a plurality of control cables C1 through which a first ON signal and a second ON signal are transmitted separately. The first ON signal can correspond to the extension signal CS1. The second ON signal can correspond to the retraction signal CS2. Even if the switch unit 20 has such structure, the switch unit 20 is configured to provide a click feeling when the switch unit 20 is operated.

In the first embodiment, the controller 18 controls the positioning structure 16 with different manners in response to the first operation where the operating member 20a is moved in the first direction D1 and the second operation where the operating member 20a is moved in the second direction D2. However, the controller 18 can control the positioning structure 16 with a same manner in response to both the first operation where the operating member 20a is moved in the first direction D1 and the second operation where the operating member is moved in the second direction D2. In this case, the switch unit 20 can transmit a same electric signal ES when the operating member 20a is moved in either the first direction D1 or the second direction D2. In addition, the operating member 20a can be movable in a third direction different from the first direction D1 and the second direction D2, or another operating member can be provided in the bicycle 1. For example, the controller 18 can lengthen the length L of the electric seatpost assembly 10 in response to both the first operation and the second operation. The controller 18 can shorten the length L of the electric seatpost assembly 10 when the operating member 20a is moved in the third direction or the other operating member is operated. Alternatively, the controller 18 can shorten the length L of the electric seatpost assembly 10 in response to both the first operation and the second operation, and the controller 18 can shorten the length L of the electric seatpost assembly 10 when the operating member 20a is moved in the third direction or the other operating member is operated.

Further, in a case where the positioning structure 16 can be configured to position the second member 14 relative to the first member 12 such that the predetermined first length L1 and the predetermined second length L2 different from the first length L1 are realized as the length L of the electric seatpost assembly 10, the controller 18 is configured to lengthen or shorten the length L of the electric seatpost assembly 10 based on the current length of the electric seatpost assembly 10 in response to the first operation and the second operation.

Second Embodiment

An electric seatpost assembly 110 provided in accordance with a second embodiment will be described below referring to FIG. 4. The electric seatpost assembly 10 in the first embodiment includes a mechanical driven telescopic seatpost, whereas the electric seatpost assembly 110 in the second embodiment includes a hydraulic telescopic seatpost.

Other structure and/or configuration of the electric seatpost assembly 110 is substantially the same as those of the electric seatpost assembly 10. Thus, elements having substantially the same function as those in the first embodiment will be numbered the same here, and will not be described and/or illustrated again in detail here for the sake of brevity.

Figure 4:
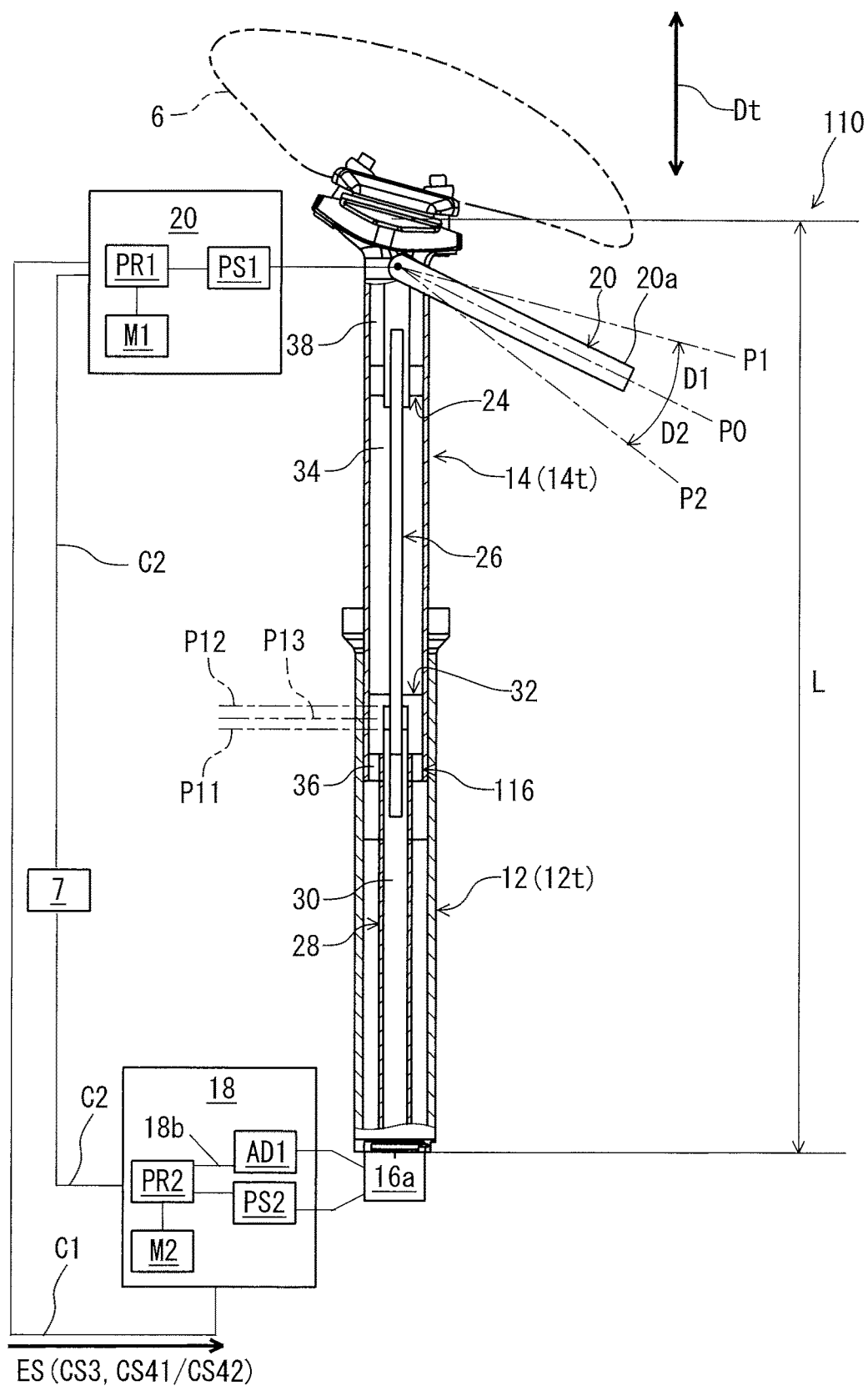
FIG. 4 is a schematic block diagram of an electric seatpost assembly in accordance with a second embodiment.

As seen in FIG. 4, the electric seatpost assembly 110 includes the first member 12 (the first tube 12t), the second member 14 (the second tube 14t), and a positioning structure 116. The positioning structure 116 includes the actuator 16a, a floating piston 24, a rod 26, a guide member 28, a flow control part 30, and a valve unit 32. The positioning structure 116 is configured to position the second member 14 relative to the first member 12 in the following mechanism.

The valve unit 32 divides an interior bore of the second tube 14t into a first fluid chamber 34 and a second fluid chamber 36. The flow control part 30 is provided in the guide member 28 to move relative to the valve unit 32 between a closed position P11 and an open position P12 in the telescopic direction Dt. The flow control part 30 is biased by a biasing element (not shown) toward the closed position P11.

The valve unit 32 is closed when the flow control part 30 is positioned at the closed position P11. The valve unit 32 is open when the flow control part 30 is positioned at the open position P12. The valve unit 32 is coupled to the first tube 12t via the guide member 28 to move together relative to the second tube 14t. The first fluid chamber 34 is disposed between the valve unit 32 and the floating piston 24. The second fluid chamber 36 is disposed between the valve unit 32 and a lower end of the second tube 14t. The flow control part 30 cooperates with the guide member 28 and the valve unit 32 to control flow of fluid between the first fluid chamber 34 and the second fluid chamber 36 to change a position of the second tube 14t relative to the first tube 12t.

When the valve unit 32 is closed, the second tube 14t is positioned relative to the first tube 12t in the telescopic direction Dt. When the valve unit 32 is open, the second tube 14t is movable relative to the first tube 12t in the telescopic direction Dt. The floating piston 24 is disposed in the interior bore of the second tube 14t and forms a gas chamber 38 disposed between the floating piston 24 and an upper end of the second tube 14t. The shorter total length of the electric seatpost assembly 110 increases an inner pressure of the gas chamber 38. The electric seatpost assembly 110 includes structures which have been known in the bicycle field, they will not be described and/or illustrated in detail here for the sake of brevity.

In this embodiment, the controller 18 moves the flow control part 30 from the closed position P11 to the open position P12 when the operating member 20a is moved to the operated position (e.g. P1 and P2). The controller 18 keeps the flow control part 30 at the closed position P11 when the operating member 20a is positioned at the rest position P0.

The actuator 16a is mechanically coupled to the flow control part 30 to move the flow control part 30 between the closed position P11 and the open position P12. The rotational shaft is coupled to the flow control part 30 via a gear reducer (not shown). The position sensor PS2 is configured to sense a valve position of the flow control part 30 via the actuator 16a. The position sensor PS2 is configured to sense an absolute rotational position of the rotational shaft of the actuator 16a as the valve position of the flow control part 30. The valve position of the flow control part 30 is stored in the memory M2. The processor PR2 generates a control signal based on an electric signal ES from the switch unit 20 and the valve position of the flow control part 30.

The actuator driver AD1 is configured to control the actuator 16a based on the control signal generated by the processor PR2. In this embodiment, the actuator driver AD1 controls a rotational direction and/or a rotational speed of the actuator 16a based on the control signal generated by the processor PR2. Furthermore, the actuator driver AD1 is configured to stop rotation of the rotational shaft to position the flow control part 30 at one of the closed position P11 and the open position P12 based on the valve position and the electric signal ES from the switch unit 20.

In this embodiment, the controller 18 can control the positioning structure 116 in two different ways. First, the controller 18 can control the positioning structure 116 with a same manner in response to both the first operation where the operating member 20a is moved in the first direction D1 and the second operation where the operating member is moved in the second direction D2. In this case, the switch unit 20 can transmit a same electric signal ES (a valve open control signal CS3) when the operating member 20a is moved in either the first direction D1 or the second direction D2. The switch unit 20 is configured to continuously transmit the at least one electric signal ES while the switch unit 20 is operated. For example, the switch unit 20 is configured to continuously transmit the valve open control signal CS3 while the operating member 20a is positioned at the operated position P1 or P2, and the controller 18 controls the actuator 16a to keep the flow control part 30 at the open position P12 while the controller 18 receives the valve open control signal CS3. Alternatively, the switch unit 20 is configured to transmit the at least one electric signal ES for a predetermined transmission time period per one operation of the switch unit 20. For example, the switch unit 20 is configured to transmit the valve open control signal CS3 for a predetermined transmission time period when the operating member 20a is moved in the first direction D1 or the second direction D2 or when the operating member 20a reaches the operated position P1 or P2.

In the above examples, the controller 18 is configured to continuously control the positioning structure 116 while the controller 18 receives the at least one electric signal ES from the switch unit 20. However, the controller 18 can be configured to control the positioning structure 116 to move the actuator 16a for a predetermined actuation time period in response to the at least one electric signal ES transmitted per one operation of the switch unit 20. For example, the controller 18 controls the actuator 16a to keep the flow control part 30 at the open position P12 for a predetermined actuation time period once the controller 18 receives the valve open control signal CS3 regardless of a time length while the controller 18 receives the valve open control signal CS3. The predetermined actuation time period can be set in advance or included in the valve open control signal CS3.

Second, the controller 18 controls the positioning structure 116 with different manners in response to a first operation where the operating member 20a is moved in the first direction D1 and a second operation where the operating member 20a is moved in the second direction D2. In one example, the controller 18 is configured to actuate the positioning structure 116 for a first time period in response to the first operation. The controller 18 is configured to actuate the positioning structure 116 for a second time period in response to the second operation. The second time period is different from the first time period. Specifically, the switch unit 20 is configured to transmit the valve open control signal CS3 for the first time period when the operating member 20a is moved in the first direction D1 or when the operating member 20a reaches the operated position P1. The switch unit 20 is configured to transmit the valve open control signal CS3 for the second time period when the operating member 20a is moved in the second direction D2 or when the operating member 20a reaches the operated position P2. Alternatively, the switch unit 20 is configured to transmit a first valve open control signal CS41 when the operating member 20a is moved in the first direction D1 or when the operating member 20a reaches the operated position P1, the controller 18 controls the actuator 16a to keep the flow control part 30 at the open position P12 for the first time period once the controller 18 receives the first valve open control signal CS41 regardless of a time length while the controller 18 receives the first valve open control signal CS41. The switch unit 20 is configured to transmit a second valve open control signal CS42 when the operating member 20a is moved in the second direction D2 or when the operating member 20a reaches the operated position P2, the controller 18 controls the actuator 16a to keep the flow control part 30 at the open position P12 for the second time period once the controller 18 receives the second valve open control signal CS42 regardless of a time length while the controller 18 receives the second valve open control signal CS42.

In another example, the controller 18 is configured to control the positioning structure 116 to move the actuator 16a for a first amount in response to the first operation. The controller 18 is configured to control the positioning structure 116 to move the actuator 16a for a second amount different from the first amount in response to the second operation. In this example, as seen in FIG. 4, the actuator 16a can move the flow control part 30 to a half-open position P13 between the closed position P11 and the open position P12 in the telescopic direction Dt. A valve opening area generated by the flow control part 30 positioned at the half-open position P13 is narrower than a valve opening area generated by the flow control part 30 positioned at the open position P12, thereby a velocity of the movement of the second member 14 is controlled by selection from the open position P12 and the half-open position P13. However, the half-open position P13 is merely an example, the position P13 can be more widely open position than the open position P12. The switch unit 20 is configured to continuously transmit the at least one electric signal ES while the switch unit 20 is operated. Specifically, the switch unit 20 is configured to continuously transmit the first valve open control signal CS41 while the operating member 20a is positioned at the operated position P1, and the controller 18 controls the actuator 16a to keep the flow control part 30 at one of the open position P12 and the half-open position P13 while the controller 18 receives the first valve open control signal CS41, and the switch unit 20 is configured to continuously transmit the second valve open control signal CS42 while the operating member 20a is positioned at the operated position P2, and the controller 18 controls the actuator 16a to keep the flow control part 30 at the other of the open position P12 and the half-open position P13 while the controller 18 receives the second valve open control signal CS42.

In this case, the switch unit 20 is configured to transmit the at least one electric signal ES for a predetermined transmission time period per one operation of the switch unit 20. Specifically, the switch unit 20 can transmit the first valve open control signal CS41 for a predetermined transmission time period when the operating member 20a is moved in the first direction D1 or when the operating member 20a reaches the operated position P1 regardless of a time to maintain the operating member 20a at the operated position P1. The switch unit 20 can transmit the second valve open control signal CS42 for a predetermined transmission time period when the operating member 20a is moved in the second direction D2 or when the operating member 20a reaches the operated position P2 regardless of a time to maintain the operating member 20a at the operated position P2.

Further, the controller 18 can be configured to control the positioning structure 116 to move the actuator 16a for a predetermined actuation time period in response to the at least one electric signal ES transmitted per one operation of the switch unit 20. Specifically, the controller 18 can control the actuator 16a to keep the flow control part 30 at one of the open position P12 and the half-open position P13 for a predetermined actuation time period once the controller 18 receives the first valve open control signal CS41 regardless of a time length while the controller 18 receives the first valve open control signal CS41, and the controller 18 can control the actuator 16a to keep the flow control part 30 at the other of the open position P12 and the half-open position P13 for a predetermined actuation time period once the controller 18 receives the second valve open control signal CS42 regardless of a time length while the controller 18 receives the second valve open control signal CS42. The predetermined actuation time period can be set in advance or included in the first valve open control signal CS41 and the second valve open control signal CS42.

With the electric seatpost assembly 110, even though the electric seatpost assembly 110 includes a hydraulic telescopic seatpost, it is possible to change the length L of the electric seatpost assembly 110 without a remote switch adjacent to the handlebar 5. Accordingly, it is possible to simplify wiring between the switch unit 20 and the controller 18 and/or to reduce the number of parts of the electric seatpost assembly 10.

Modifications of Second Embodiment

In the second embodiment, the operating member 20a can be movable only in the first direction D1, and the first direction D1 may not be the upward direction DB21. In addition, the push button 21 illustrated in FIG. 3 can be applied to the switch unit 20 in the second embodiment. Alternatively, the switch unit 20 can have the substantially the same structure as that of a toggle switch as described in the modification of the first embodiment.

Third Embodiment

An electric seatpost assembly 210 in accordance with a third embodiment will be described below referring to FIG. 5. The electric seatpost assembly 210 has the same structure and/or configuration as those of the electric seatpost assembly 10 in the first embodiment except for the switch unit 220. Thus, elements having substantially the same function as those in the second embodiment will be numbered the same here, and will not be described and/or illustrated again in detail here for the sake of brevity.

Figure 5:
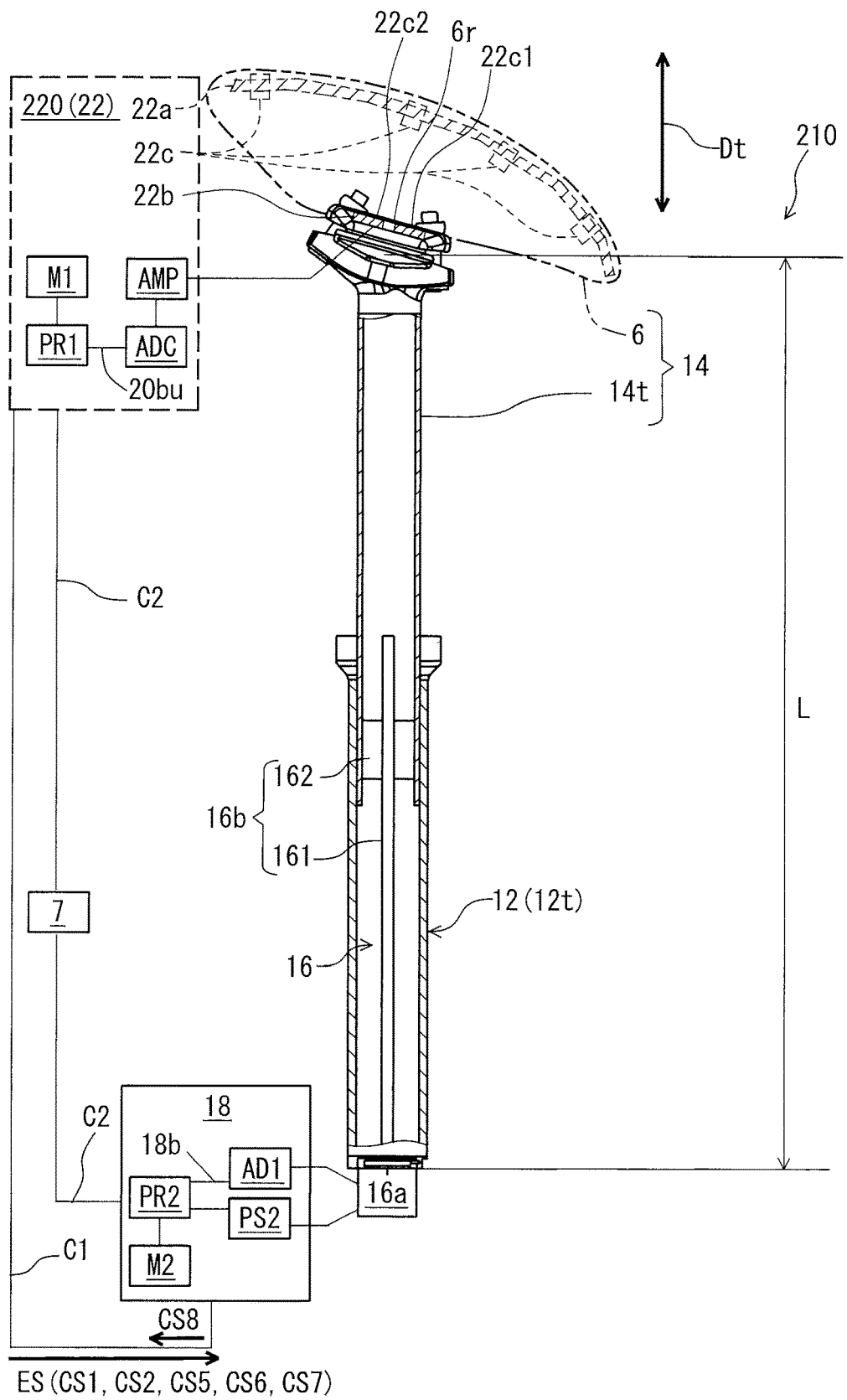
FIG. 5 is a schematic block diagram of an electric seatpost assembly in accordance with a third embodiment.

As seen in FIG. 5, the switch unit 220 includes a seating detector 22 to detect a ride on the second member 14. The ride includes at least one of a riding posture of a rider and a seat load applied to the seat 6 or the second member 14. The seating detector 22 includes at least one of a membrane switch 22a, a displacement sensor 22b, and a tact switch 22c. The seating detector 22 further includes the processor PR1, the memory M1 as the switch unit 20 in the first embodiment includes. In a case where the seating detector 22 includes the displacement sensor 22b, the seating detector 22 preferably includes an amplifier AMP and an A/D converter ADC to amplify an analog signal output from the displacement sensor 22b to convert it to a digital signal.

Figure 6:
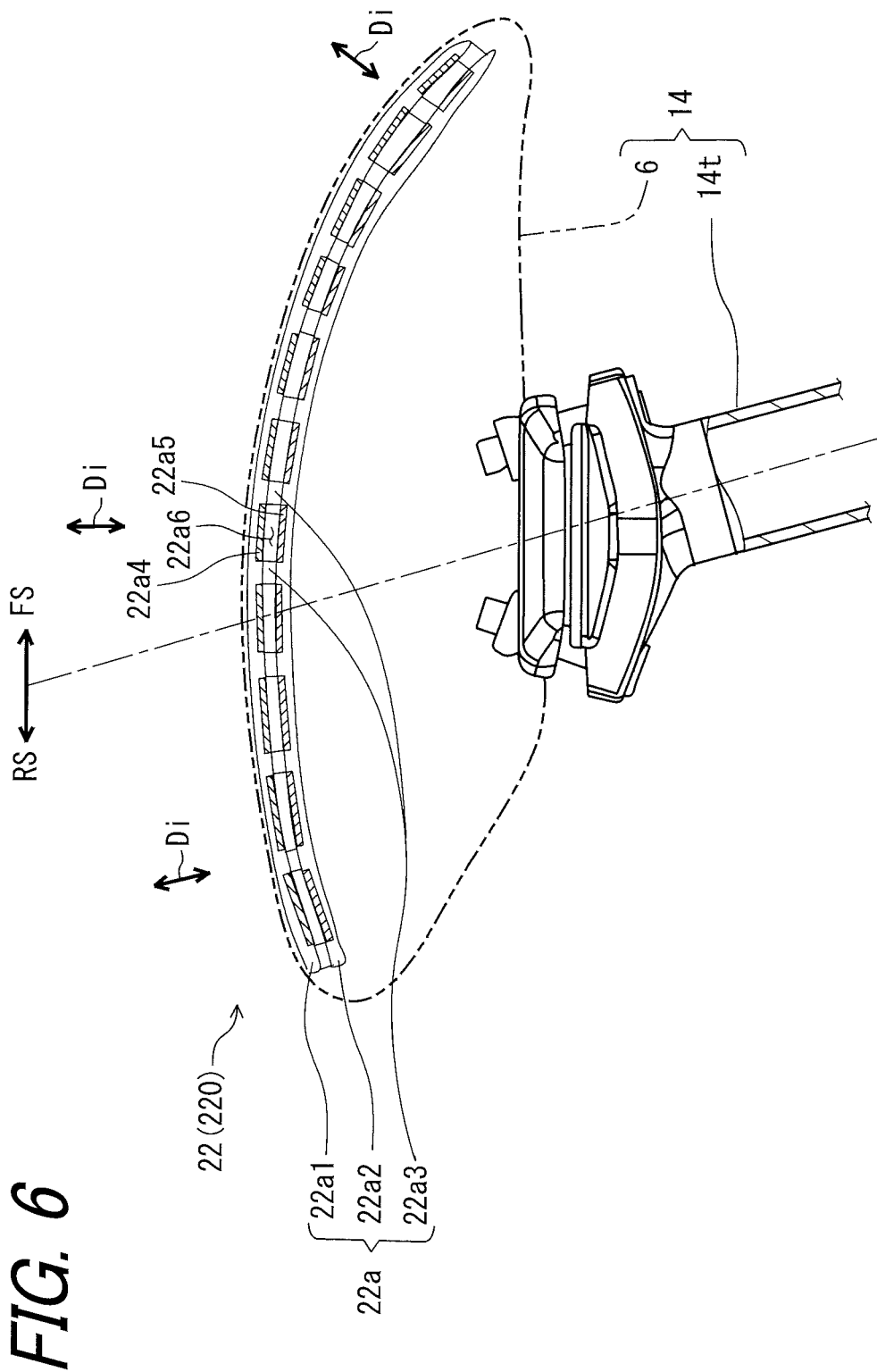
FIG. 6 is an enlarged view of a membrane switch illustrated in FIG. 5.

The membrane switch 22a is disposed in the seat 6 to detect a weighted part of the seat 6 to which a load over a predetermined level is applied to output at least one electric signal ES based on the weighted part. As seen in FIG. 6, the membrane switch 22a typically includes a first flexible film substrate 22a1, a second flexible film substrate 22a2, and a spacer 22a3. On the first flexible film substrate, a first conductive pattern including a first electrode 22a4 is provided. On the second first flexible film substrate, a second conductive pattern including a second electrode 22a5 is provided. The second flexible film substrate 22a2 is disposed apart from the first flexible film substrate 22a1 in an intermembrane direction Di. The spacer 22a3 is disposed between the first flexible film substrate 22a1 and the second flexible film substrate 22a2 in the intermembrane direction Di. The first electrode 22a4 overlaps with the second electrode 22a5 viewed in the intermembrane direction Di. The spacer 22a3 provides an opening 22a6 overlapping with the first electrode 22a4 and the second electrode 22a5 in the intermembrane direction Di. When a rider does not sit on the seat 6, the first electrode 22a4 does not contact with the second electrode 22a5, thereby the membrane switch 22a detects a load less than the predetermined level is applied to all part of the seat 6. When a rider sits on the seat 6, at least one of the first flexible film substrate 22a1 and the second flexible film substrate 22a2 in at least a part of the membrane switch 22a is curved in the intermembrane direction Di, thereby the first electrode 22a4 contacts with the second electrode 22a5. In this case, the membrane switch 22a detects a weighted part of the seat 6 to which a load equal to or over the predetermined level is applied. The membrane switch 22a also detect a riding posture of a rider by detecting the weighted part of the seat 6. For example, when the rider rides in a normal sitting posture, the membrane switch 22a detects a ratio of the weighted part is in the front side FS to the weighted part is in a rear side RS of the seat 6 which is opposite to the front side FS in a front-back direction DB3 (see FIG. 1) of the bicycle 1 falls in a predetermined range, thereby the membrane switch 22a detects the normal sitting posture. When the rider rides in a forward-bent sitting posture, the membrane switch 22a detects the ratio of the weighted part is in the front side FS to the weighted part is in the rear side RS falls over the predetermined range, thereby the membrane switch 22a detects the forward-bent sitting posture. When the rider rides in a backward tilted sitting posture, the membrane switch 22a detects the ratio of the weighted part is in the front side FS to the weighted part is in the rear side RS falls below the predetermined range, thereby the membrane switch 22a detects the backward tilted sitting posture.

As seen in FIG. 5, the displacement sensor 22b include a piezoelectric element or an electric-resistance strain gauge to detect a displacement (an elastic deformation) of the seat 6 or the second member 14 to detect a weighted part of the seat 6 to which a load over a predetermined level is applied. In a case where the displacement sensor 22b is an electric-resistance strain gauge, the electric resistance strain gauge is provided on a seat rail 6r of the seat 6 to output at least one electric signal ES based on an elastic deformation of the seat rail 6r (the displacement of the seat 6), for example. However, the electric resistance strain gauge can be provided in a different place. For example, the electric resistance stain gauge can be attached to at least one of an inner peripheral surface of the second tube 14t and an outer peripheral surface of the second tube 14t. The displacement sensor 22b can include a plurality of electric resistance strain gauges attached to various parts of the seat rail 6r. In the illustrated example, the displacement sensor 22b includes a first electric resistance strain gauge 22c1 attached to a front part of the seat rail 6r and a second electric resistance strain gauge 22c2 attached to a rear part of the seat rail 6r. When the rider rides in a normal sitting posture, a ratio of a front elastic deformation detected by the first electric resistance strain gauge 22c1 to a rear elastic deformation detected by that second electric resistance strain gauge 22c2 falls in a predetermined range, thereby the displacement sensor 22b detects the normal sitting posture. When the rider rides in a forward-bent posture, the ratio of the front elastic deformation to the rear elastic deformation falls over the predetermined range, thereby the displacement sensor 22b detects the forward-bent posture. When the rider rides in the backward tilted posture, the ratio of the front elastic deformation to the rear elastic deformation falls below the predetermined range, thereby the displacement sensor 22b detects the backward tilted posture. In a case where the displacement sensor 22b includes a piezoelectric element, a plurality of piezoelectric elements can be attached to various seat attachment members of the second member 14 including the at least one of the inner peripheral surface of the second tube 14t and the outer peripheral surface of the second tube 14t to detect a weighted part of the seat 6. The rider's posture detection algorithm of the plurality of piezoelectric elements can be substantially the same as that of the electric resistance strain gauges, and will not be described again in detail here for the sake of brevity.

Figure 7:
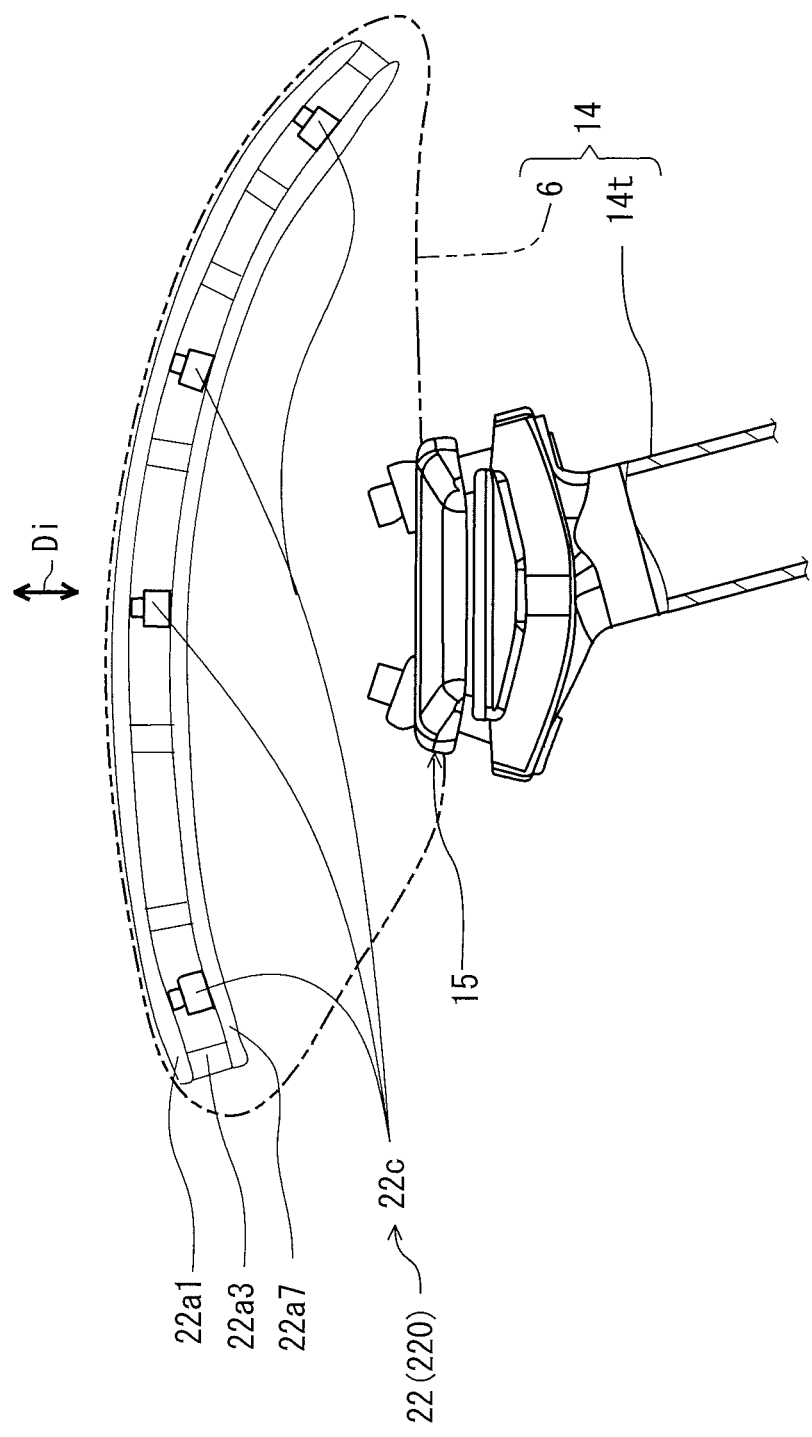
FIG. 7 is an enlarged view of a tact switch illustrated in FIG. 5.

As seen in FIG. 7, the displacement sensor 22b can include a plurality of tact switches 22c disposed between the first flexible film substrate 22a1 and a third film substrate 22a7 in the intermembrane direction Di at various positions of the seat 6. However, at least one tact switch 22c can be disposed in a different place in the second member 14 such as a seat attachment part 15 of the second tube 14t. The third film substrate 22a7 is preferably rigid and supports the tact switches 22c. The spacer 22a3 is disposed between the first flexible film substrate 22a1 and the third film substrate 22a7 in the intermembrane direction Di. The plurality of tact switches 22c are disposed between two adjacent spacers 22a3. The first flexible film substrate 22a1 is preferably made of an elastic member to return to its original position when the first flexible film substrate 22a1 is not pressed. When a part of the first flexible film substrate 22a1 is positioned in the original position, a tact switch 22c overlapping with the part of the first flexible film substrate 22a1 is switched off, thereby the output of the tact switch 22c shows that a load less than the predetermined level is applied to the part of the first flexible film substrate 22a1. When a rider sits on the seat 6, at least a part of the first flexible film substrate 22a1 is curved in the intermembrane direction Di, thereby at least one tact switch 22c overlapping with the at least a part of the first flexible film substrate 22a1 is switched on. In this case, the at least one tact switch 22c detects a weighted part of the seat 6 to which a load equal to or over the predetermined level is applied. The tact switch 22c also detects a riding posture of a rider by detecting the weighted part of the seat 6 in the same manner as the membrane switch 22a.

As seen in FIG. 5, the seating detector 22 is configured to detect a riding posture on the second member 14 to transmit the at least one electric signal ES. More specifically, the processor PR1 generates the at least one electric signal ES based on the riding posture detected by the at least one of the membrane switch 22a, the displacement sensor 22b, and the tact switch 22c to transmit the at least one electric signal ES to the controller 18. The riding posture can include a sitting posture including at least one of the normal sitting posture, the forward-bent sitting posture, and the backward tilted posture. The riding posture can further include a standing posture in which the rider stands at a bicycle pedal 8 (See FIG. 1) without sitting on the seat 6. In this case, the seating detector 22 can further includes a pressure sensor (e.g. an electric-resistance strain gauge) disposed on the bicycle pedal 8 to detect a pedaling force of the rider. The at least one electric signal ES can include control signals corresponding to the above riding postures. The at least one electric signal ES includes the extension signal CS1 to lengthen the length L of the electric seatpost assembly 210. The at least one electric signal ES includes the retraction signal CS2 to shorten the length L of the electric seatpost assembly 210. Further, the at least one electric signal ES can include a trigger signal CS5. The trigger signal CS5 is to instruct the controller 18 to start lengthening the length L of the electric seatpost assembly 210 after the extension signal CS1 is transmitted. The at least one electric signal ES can include a canceling signal CS6. The canceling signal CS6 is to instruct the controller 18 to cancel a command of the extension signal CS1 before starting the lengthening.

The controller 18 is configured to control the positioning structure 16 in response to the at least one electric signal ES. The controller 18 can control the positioning structure 16 in accordance with several methods which will be described hereinafter:

First Method

The controller 18 is configured to be instructed to lengthen the length L of the electric seatpost assembly 210 when the rider sits on the seat 6 in a first riding posture. The controller 18 is configured to start lengthening when the rider rides on the bicycle 1 in the standing posture. The controller 18 is configured to cancel the instruction to lengthen the length L of the electric seatpost assembly 210 when the rider sits on the seat 6 in a second riding posture after the rider sits in the first riding posture and before the rider rides in the standing posture. The controller 18 is configured to shorten the length L of the electric seatpost assembly 210 when the rider sits on the seat in a third riding posture that is different from the first riding posture.

Figure 8:
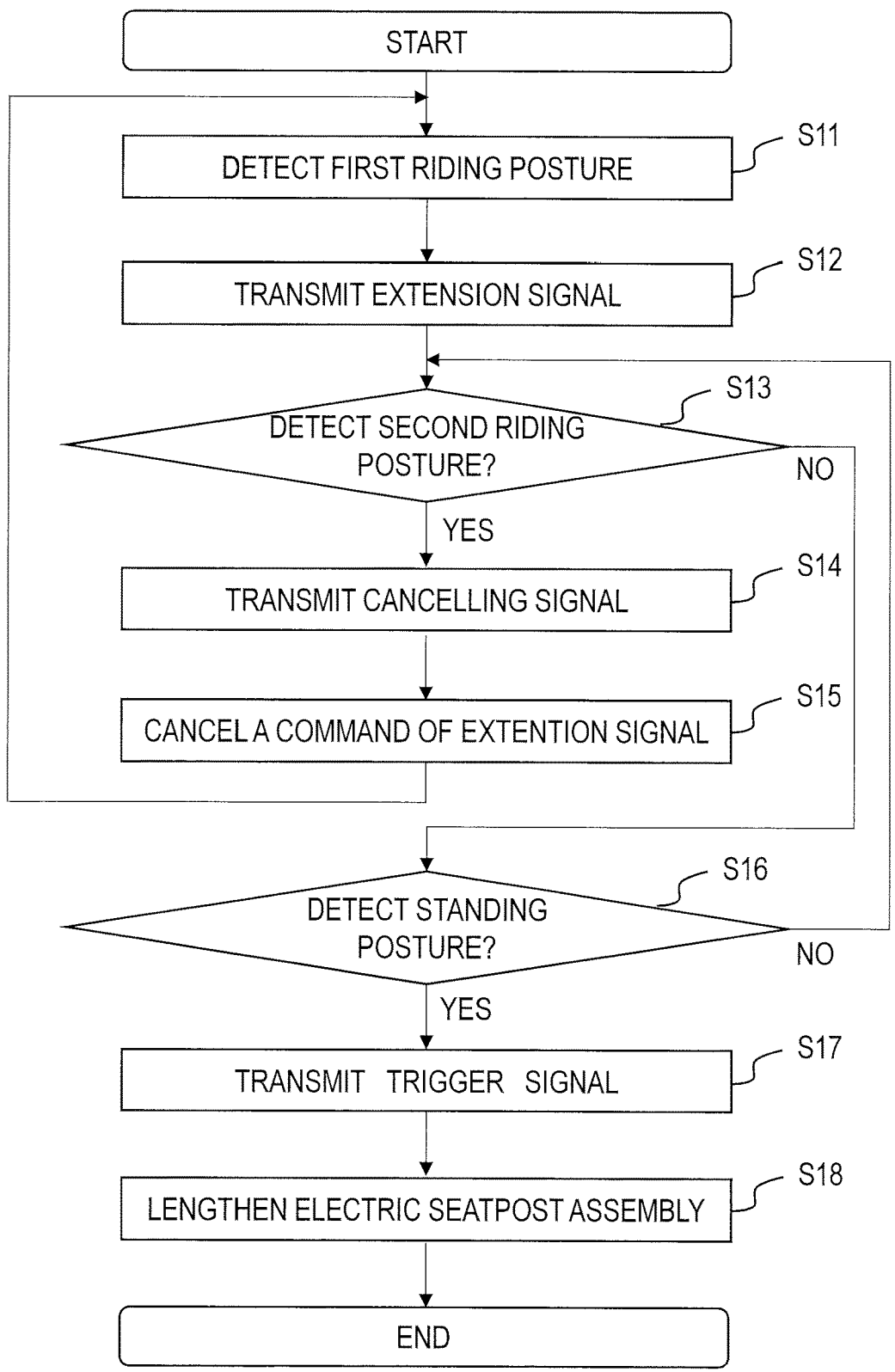
FIG. 8 illustrates a flow chart showing processes in a first method executed by a controller with the third embodiment.

In this method, as seen in FIG. 8, the seating detector 22 detects a first riding posture (Step S11). Preferably, the first riding posture is the backward tilted sitting posture, but the first riding posture can be a different sitting posture from the backward tilted sitting posture such as the forward-bent sitting posture. When the first riding posture is detected, the seating detector 22 transmits the extension signal CS1 to the controller 18 (Step S12). That is, the seating detector 22 is configured to transmit the extension signal CS1 to the controller 18 in response to detection of the first riding posture.

Then, when the seating detector 22 detects a second riding posture (YES in Step S13) that is different from the first riding posture, the seating detector 22 transmits the canceling signal CS6 to the controller 18 (Step S14). That is, the seating detector 22 is configured to transmit the canceling signal CS6 to the controller 18 in response to detection of the second riding posture that is different from the first riding posture. Preferably, the second riding posture is opposite to the first riding posture. More preferably, the second riding posture is the forward-bent sitting posture. In a case where the first riding posture is the forward-bent sitting posture, the second riding posture is the backward tilted sitting posture. The controller cancels a command based on the extension signal CS1 in response to the canceling signal CS6 (Step S15). After Step 15 is performed, the controller 18 waits for the extension signal SC1 again (Return to Step S11).

When the seating detector 22 detects the standing posture (Yes in Step S16) without detecting the second riding posture (No in Step S13), the seating detector 22 is configured to transmit the trigger signal CS5 to the controller 18 (Step S17). That is, the seating detector 22 is configured to transmit the trigger signal CS5 to the controller 18 in response to detection of unloading onto the second member 14. When the controller 18 receives the trigger signal CS5, the controller 18 starts controlling the positioning structure 16 to lengthen the length L of the electric seatpost assembly 210 (S18). That is, the controller 18 is configured to control the positioning structure 16 to lengthen the length L of the electric seatpost assembly 210 in response to the trigger signal CS5 after receiving the extension signal CS1. In Step S18, the controller 18 is configured to control the positioning structure 16 to move the actuator 16a for a predetermined actuation time period in response to the trigger signal CS5.

As seen in Steps S13, S14, S16, and S17, the canceling signal CS6 is transmitted when the second riding posture is detected before the standing posture is detected. Accordingly, as seen in step S15, the controller 18 is configured to cancel a command based on the extension signal CS1 in response to the canceling signal CS6 before receiving the trigger signal CS5.

Figure 9:
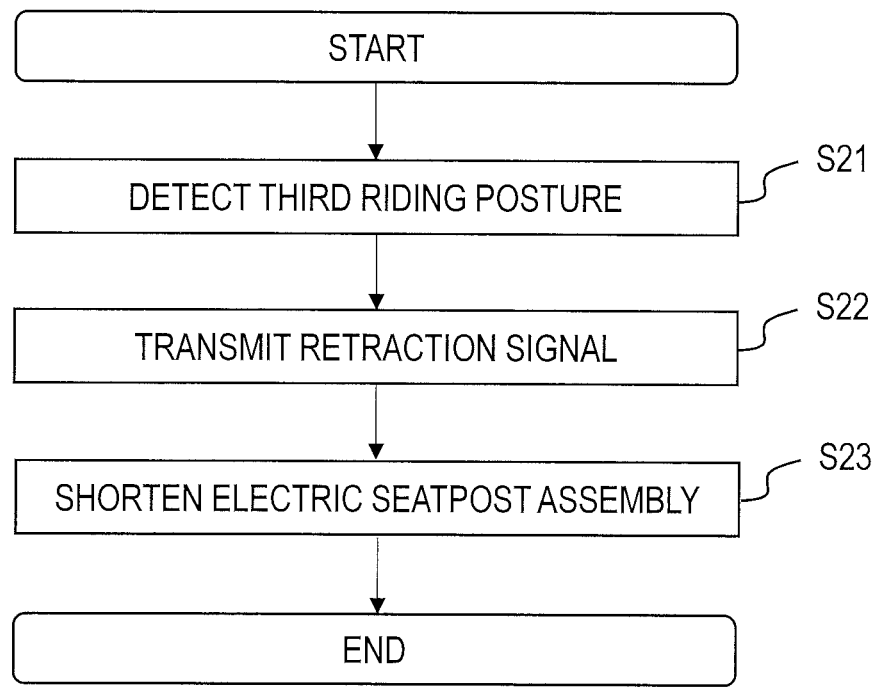
FIG. 9 illustrates a flow chart showing processes in the first method executed by the controller with the third embodiment.

As seen in FIG. 9, when the seating detector 22 detects a third riding posture (Step S21), the seating detector 22 transmits the retraction signal CS2 to the controller 18 (Step S22). That is, the seating detector 22 is configured to transmit the retraction signal CS2 to the controller 18 in response to detection of the third riding posture. The third riding posture is different from the first riding posture. For example, a center of balance of the weighted part of the seat 6 in the third riding posture is in front of a center of balance of the weighted part of the seat 6 in the first riding posture in the front-back direction DB3 of the bicycle 1. Alternatively, the third riding posture is more forward tilted posture than the first riding posture. More specifically, the third riding posture includes the forward-bent sitting posture. The third riding posture can be equal to the second riding posture.

When the controller 18 receives the retraction signal CS2, the controller 18 controls the positioning structure 16 to shorten the length L of the electric seatpost assembly 210 (Step 23). That is, the controller 18 is configured to control the positioning structure 16 to shorten the length L of the electric seatpost assembly 210 in response to the retraction signal CS2. The controller 18 is configured to shorten the length L of the electric seatpost assembly 210 in response to the retraction signal CS2 regardless of loading and unloading of the seat 6 after receiving the retraction signal CS2. In Step S23, the controller 18 is configured to control the positioning structure 16 to move the actuator 16a for a predetermined actuation time period in response to the retraction signal CS2.

Second Method

In the third embodiment, similarly to the modification of the first embodiment, the positioning structure 16 can be configured to position the second member 14 relative to the first member 12 such that the predetermined first length L1 and the predetermined second length L2 different from the first length L1 are realized as the length L of the electric seatpost assembly 210. The predetermined first length L1 is the maximum length of the electric seatpost assembly 210. The predetermined second length L2 is the minimum length of the electric seatpost assembly 210. In this method, simply, one posture or a pair of two postures can be used to change the length L of the electric seatpost assembly 210. For example, the one posture includes either the sitting posture or the standing posture. The two postures are the sitting posture and the standing posture. However, the one posture can include the forward-bent sitting posture or the backward tilted posture, and the two postures can include the forward-bent sitting posture and the backward tilted posture.

In the second method, there are four algorithms that the controller 18 can perform to change the length L of the electric seatpost assembly 210.

First Algorithm

Figure 10:
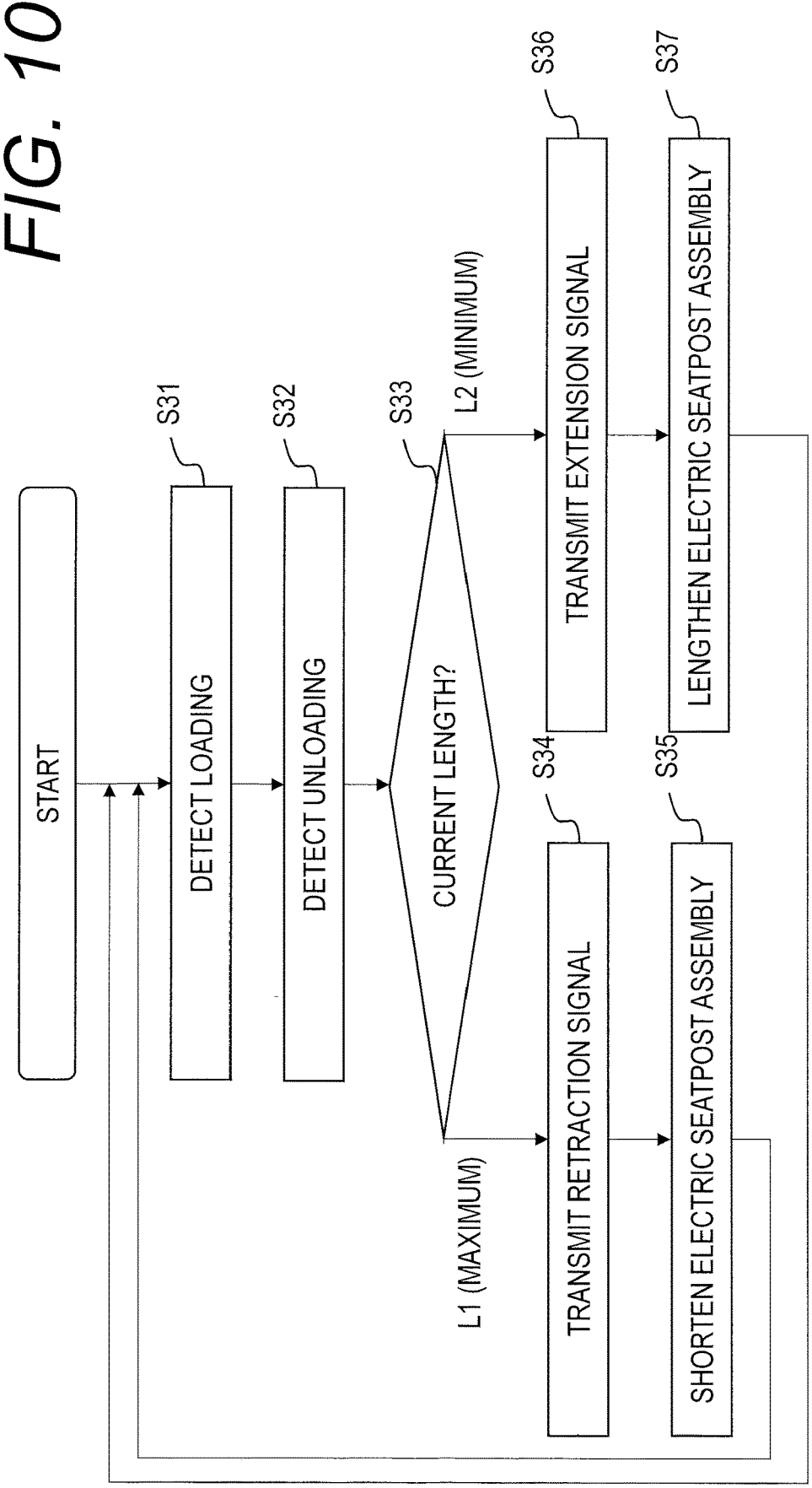
FIG. 10 illustrates a flow chart showing processes in a first algorithm in a second method executed by the controller with the third embodiment.

As seen in FIG. 10, the seating detector 22 detects loading onto the second member 14, i.e. the sitting posture (Step S31). Then, the seating detector 22 detects unloading onto the second member 14, i.e. the standing posture (Step S32). After Step S32, the seating detector 22 determines whether a current length of the electric seatpost assembly 210 is the maximum length L1 or the minimum length L2 (Step S33). To realize this process, the memory M1 stores the current length of the electric seatpost assembly 210. If the current length of the electric seatpost assembly 210 is the maximum length L1 (L1 in Step S33), the seating detector 22 transmits the retraction signal CS2 to the controller 18 (Step S34). Namely, the seating detector 22 is configured to transmit the retraction signal CS2 to the controller 18 in response to detection of one of loading and unloading onto the second member 14. More specifically, the seating detector 22 is configured to transmit the retraction signal CS2 to the controller 18 in response to detection of unloading onto the second member 14. After transmitting the retraction signal CS2, the seating detector 22 changes the current length of the electric seatpost assembly 210 to the minimum length L2. Then, the controller 18 receives the retraction signal CS2 to shorten the length L of the electric seatpost assembly 210 in response to the retraction signal CS2 (Step S35). Namely, the controller 18 is configured to control the positioning structure 16 to shorten the length L of the electric seatpost assembly 210 in response to the retraction signal CS2. After Step S35 is finished, the electric seatpost assembly 210 performs Step S31 again.

If the current length of the electric seatpost assembly 210 is the minimum length L2 (L2 in Step S33), the seating detector 22 transmits the extension signal CS1 to the controller 18 (Step S36). Namely, the seating detector 22 is configured to transmit the extension signal CS1 to the controller 18 in response to detection of one of loading and unloading onto the second member 14. More specifically, the seating detector 22 is configured to transmit the extension signal CS1 to the controller 18 in response to detection of unloading onto the second member 14. After transmitting the extension signal CS1, the seating detector 22 changes the current length of the electric seatpost assembly 210 to the maximum length L1. Then, as soon as the controller 18 receives the extension signal CS1, the controller 18 lengthen the length L of the electric seatpost assembly 210 in response to the extension signal CS1 (Step S37). Namely, the controller 18 is configured to control the positioning structure 16 to lengthen the length L of the electric seatpost assembly 210 in response to the extension signal CS1 in a state where the seating detector 22 detects the unloading. After Step S37 is finished, the electric seatpost assembly 210 performs Step S31 again.

According to this algorithm, when the rider rides in the standing posture (Step S32) after the rider sits on the seat 6 of the electric seatpost assembly 210 having the maximum length L1 (Step S31), the retraction signal CS2 is transmitted to the controller 18 (Step S34), and the electric seatpost assembly 210 is shortened (Step S35). Then, the rider can sit on the seat 6 of the electric seatpost assembly 210 having the minimum length L2. When the rider rides in the standing posture (Step S32) after the rider sits on the seat 6 of the electric seatpost assembly 210 having the minimum length L2 (Step S31), the extension signal CS1 is transmitted to the controller 18 (Step S36), and the electric seatpost assembly 210 is lengthened (Step S37).

In another situation, when the rider rides in the standing posture with the electric seatpost assembly 210 having the maximum length L1, the rider needs to sit on the seat 6 (Step S31) and ride in the standing posture again (Step S32) to shorten the electric seatpost assembly 210. After the rider doing so, the retraction signal CS2 is transmitted to the controller 18 (Step S34), and the electric seatpost assembly 210 is shortened (Step S35). When the rider rides in the standing posture with the electric seatpost assembly 210 having the minimum length L2, the rider needs to sit on the seat 6 (Step S31) and ride in the standing posture again (Step S32) to lengthen the electric seatpost assembly 210. After the rider doing so, the extension signal CS1 is transmitted to the controller 18 (Step S36), and the electric seatpost assembly 210 is lengthened (Step S37).

Second Algorithm

Figure 11:
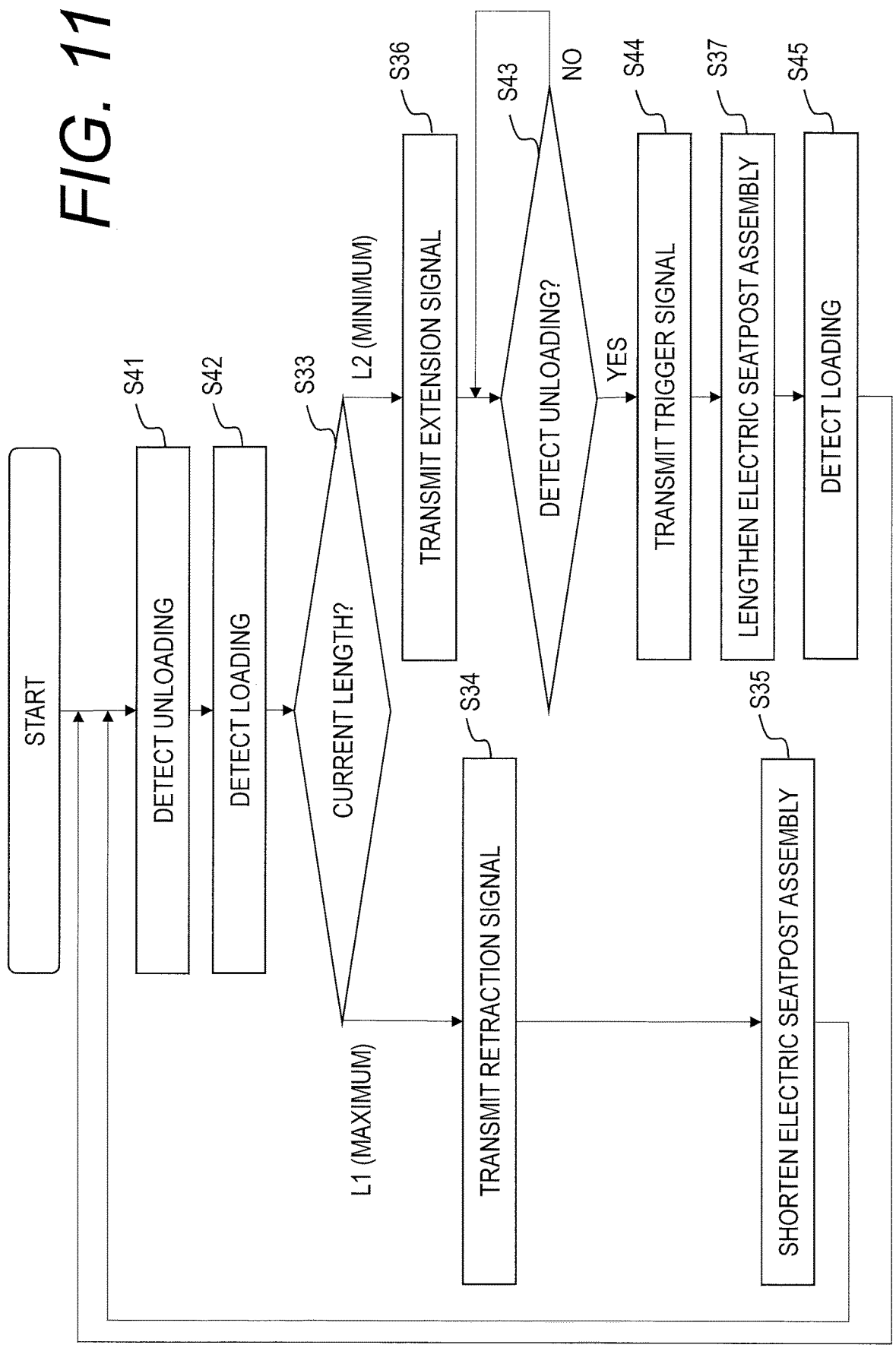
FIG. 11 illustrates a flow chart showing processes in a second algorithm in the second method executed by the controller with the third embodiment.

The second algorithm is illustrated in FIG. 11. Some processes of the second algorithm are the same as those of the first algorithm. Accordingly, the same processes as those in the first algorithm will be numbered the same here, and will not be described and/or illustrated again in detail here for the sake of brevity.

As seen in FIG. 11, the seating detector 22 detects unloading onto the second member 14, i.e. the standing posture (Step S41). Then, the seating detector 22 detects loading onto the second member 14, i.e. the sitting posture (Step S42). After Step S42, Steps S33 to S35 or Steps S33 and S36 are performed. Accordingly, the seating detector 22 is configured to transmit the extension signal CS1 to the controller 18 in response to detection of one of loading and unloading onto the second member 14. More specifically, the seating detector 22 is configured to transmit the extension signal CS1 to the controller 18 in response to detection of loading onto the second member 14. The seating detector 22 is configured to transmit the retraction signal CS2 to the controller 18 in response to detection of one of loading and unloading onto the second member 14. More specifically, the seating detector 22 is configured to transmit the retraction signal CS2 to the controller 18 in response to detection of loading onto the second member 14. The controller 18 is configured to control the positioning structure 16 to shorten the length L of the electric seatpost assembly 210 in response to the retraction signal CS2.

After the seating detector 22 transmits the extension signal CS1 to the controller 18 (Step S36), the seating detector 22 waits for unloading onto the second member 14, i.e. the standing posture (Step S43). When the seating detector 22 detects unloading onto the second member 14 (Yes in Step S43), the seating detector 22 transmits the trigger signal CS5 (Step S44). Namely, the seating detector 22 is configured to transmit the trigger signal CS5 to the controller 18 in response to detection of unloading onto the second member 14. Then, as soon as the controller 18 receives the trigger signal CS5, the controller 18 lengthen the length L of the electric seatpost assembly 210 in response to the trigger signal CS5 (Step S37). Namely, the controller 18 is configured to control the positioning structure 16 to lengthen the length L of the electric seatpost assembly 210 in response to the trigger signal CS5 after receiving the extension signal CS1. In other words, the controller 18 is configured to control the positioning structure 16 to lengthen the length L of the electric seatpost assembly 210 in response to the extension signal CS1 in a state where the seating detector 22 detects the unloading. After the seating detector 22 detects loading onto the second member 14 (Step S45), the electric seatpost assembly 210 performs Step S41 again.

According to this algorithm, when the rider sits on the seat 6 of the electric seatpost assembly 210 having the maximum length L1, the rider needs to ride in the standing posture (Step S41) and sit on the seat 6 again (Step S42) to shorten the electric seatpost assembly 210. After the rider doing so, the retraction signal CS2 is transmitted to the controller 18 (Step S34) and the electric seatpost assembly 210 is shortened (Step S35). When the rider sits on the seat 6 of the electric seatpost assembly 210 having the minimum length L2, the rider needs to ride in the standing posture (Step S41) and sit on the seat 6 again (Step S42) to lengthen the electric seatpost assembly 210. After the rider doing so, the extension signal CS1 is transmitted to the controller 18 (Step S36). Then, when the rider rides in the standing posture (Yes in Step S43) after the extension signal CS1 is transmitted, the trigger signal CS5 is transmitted to the controller 18 (Step S44), and the electric seatpost assembly 210 is lengthened (Step S37).

In another situation, when the rider sits on the seat 6 of the electric seatpost assembly 210 having the maximum length L1 (Step S42) after the rider rides in the standing posture (Step S41), the retraction signal CS2 is transmitted to the controller 18 (Step S34), and the electric seatpost assembly 210 is shortened (Step S35). Then, the rider can sit on the seat 6 of the electric seatpost assembly 210 having the minimum length L2. When the rider rides in the standing posture (Step S41) and subsequently sits on the seat 6 again (Step S42) after the rider sits on the seat 6 of the electric seatpost assembly 210 having the minimum length L2, the extension signal CS1 is transmitted to the controller 18 (Step S36). Then, when the rider rides in the standing posture again (Step S43) after the extension signal CS1 is transmitted, the trigger signal CS5 is transmitted to the controller 18 (Step S44), and the electric seatpost assembly 210 is lengthened (Step S37).

Third Algorithm

Figure 12:
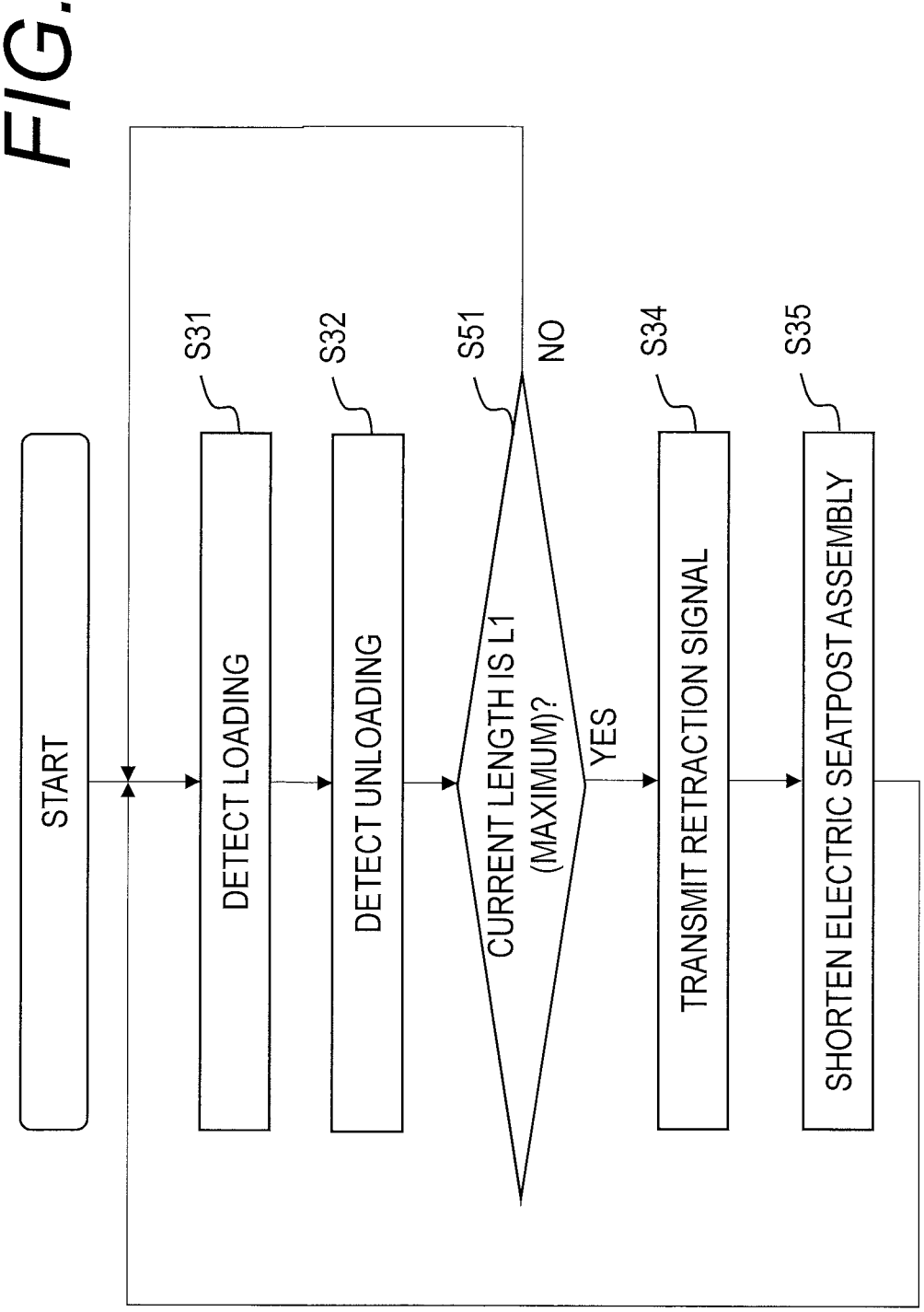
FIG. 12 illustrates a flow chart showing processes in a third algorithm in the second method executed by the controller with the third embodiment.
Figure 13:
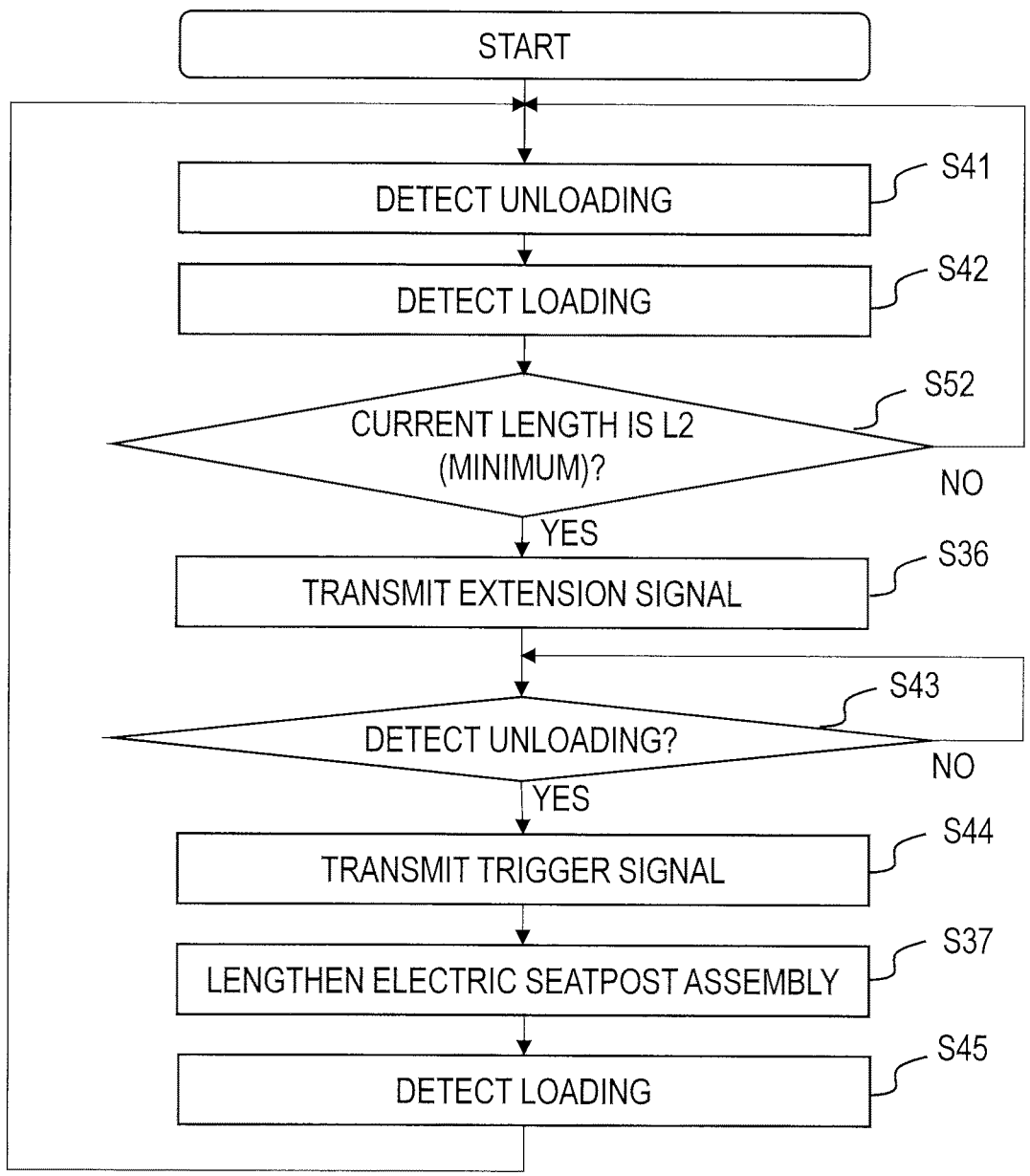
FIG. 13 illustrates a flow chart showing processes in the third algorithm in the second method executed by the controller with the third embodiment.

The third algorithm is illustrated in FIGS. 12 and 13. Some processes of the third algorithm are the same as those of the first algorithm and the second algorithm. Accordingly, the same processes as those in the first algorithm and the second algorithm will be numbered the same here, and will not be described and/or illustrated again in detail here for the sake of brevity. In addition, processes illustrated in FIG. 12 and processes illustrated in FIG. 13 are executed in parallel.

As seen in FIG. 12, after loading and unloading onto the second member 14 in this order (Steps S31 and S32), the seating detector 22 determines whether a current length of the electric seatpost assembly 210 is the maximum length L1 (Step S51). If the current length of the electric seatpost assembly 210 is the maximum length L1 (Yes in Step S51), Steps S34 and S35 are executed. Accordingly, the seating detector 22 is configured to transmit the retraction signal CS2 to the controller 18 in response to detection of one of loading and unloading onto the second member 14. More specifically, the seating detector 22 is configured to transmit the retraction signal CS2 to the controller 18 in response to detection of unloading onto the second member 14. The controller 18 is configured to control the positioning structure 16 to shorten the length L of the electric seatpost assembly 210 in response to the retraction signal CS2. After Step S35 is finished or if the current length of the electric seatpost assembly 210 is the minimum length L2 (No in Step S51), the electric seatpost assembly 210 performs Step S31 again.

As seen in FIG. 13, after unloading and loading onto the second member 14 in this order (Steps S41 and S42), the seating detector 22 determines whether a current length of the electric seatpost assembly 210 is the minimum length L2 (Step S52). If the current length of the electric seatpost assembly 210 is the minimum length L2 (Yes in Step S52), Steps S36, S43, S44, S37, and S45 are executed. Accordingly, the seating detector 22 is configured to transmit the extension signal CS1 to the controller 18 in response to detection of one of loading and unloading onto the second member 14. More specifically, the seating detector 22 is configured to transmit the extension signal CS1 to the controller 18 in response to detection of loading onto the second member 14. The seating detector 22 is configured to transmit the trigger signal CS5 to the controller 18 in response to detection of unloading onto the second member 14. The controller 18 is configured to control the positioning structure 16 to lengthen the length L of the electric seatpost assembly 210 in response to the trigger signal CS5 after receiving the extension signal CS1. The controller 18 is configured to control the positioning structure 16 to lengthen the length L of the electric seatpost assembly 210 in response to the extension signal CS1 in a state where the seating detector 22 detects the unloading. After Step S45 is finished or if the current length of the electric seatpost assembly 210 is the maximum length L1 (No in Step S52), the electric seatpost assembly 210 performs Step S41 again.

According to this algorithm, when the rider rides in the standing posture (Step S32) after the rider sits on the seat 6 of the electric seatpost assembly 210 having the maximum length L1 (Step S31), the retraction signal CS2 is transmitted to the controller 18 (Step S34), and the electric seatpost assembly 210 is shortened (Step S35). Then, the rider can sit on the seat 6 of the electric seatpost assembly 210 having the minimum length L2. When the rider sits on the seat 6 of the electric seatpost assembly 210 having the minimum length L2 (Step S42) after the rider rides in the standing posture (Step S41), the extension signal CS1 is transmitted to the controller 18 (Step S36). When the rider rides in the standing posture (Yes in Step S43) after the extension signal CS1 is transmitted, the trigger signal CS5 is transmitted to the controller 18 (Step S44), and the electric seatpost assembly 210 is lengthened (Step S37).

In another situation, when the rider rides in the standing posture with the electric seatpost assembly 210 having the maximum length L1, the rider needs to sit on the seat 6 (Step S31) and ride in the standing posture again (Step S32) to shorten the electric seatpost assembly 210. After the rider doing so, the retraction signal CS2 is transmitted to the controller 18 (Step S34), and the electric seatpost assembly 210 is shortened (Step S35). After that, when the rider sits on the seat 6 of the electric seatpost assembly 210 having the minimum length L2 (Step S42) after the rider rides in the standing posture (Step S41), the extension signal CS1 is transmitted to the controller 18 (Step S36). Then, when the rider rides in the standing posture again (Yes in Step S43) after the extension signal CS1 is transmitted, the trigger signal CS5 is transmitted to the controller 18 (Step S44), and the electric seatpost assembly 210 is lengthened (Step S37).

Fourth Algorithm

Figure 14:
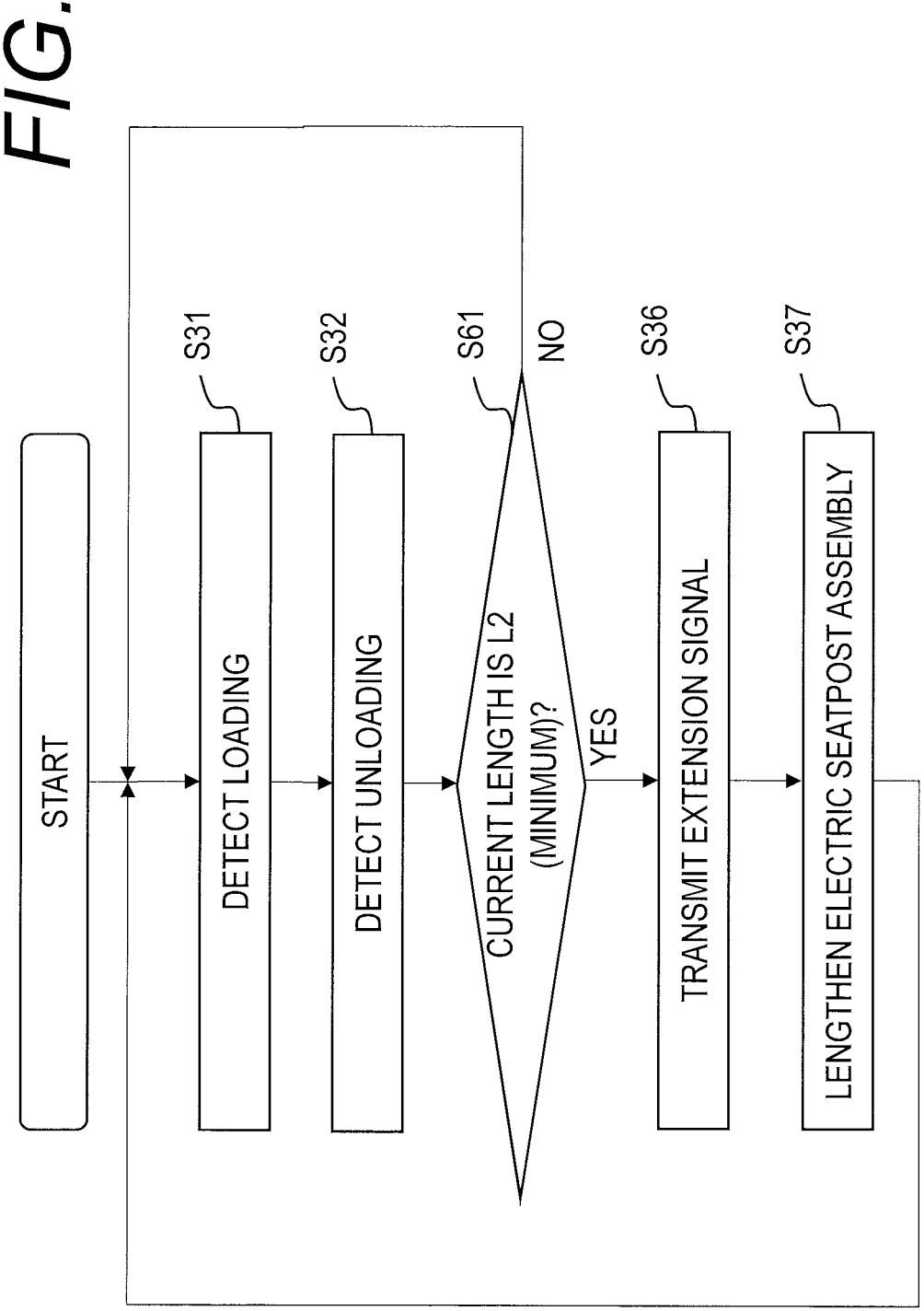
FIG. 14 illustrates a flow chart showing processes in a fourth algorithm in the second method executed by the controller with the third embodiment.
Figure 15:
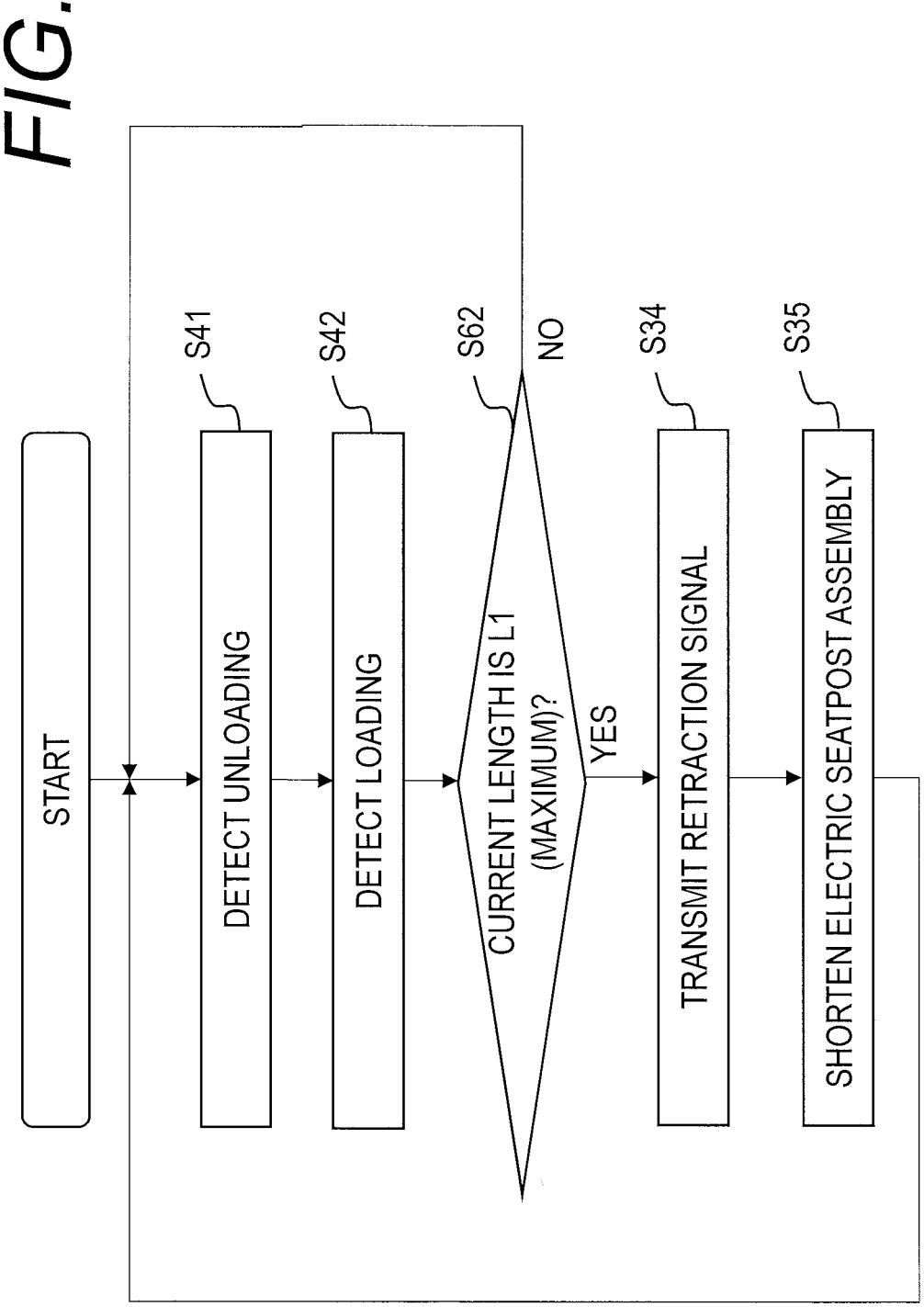
FIG. 15 illustrates a flow chart showing processes in the fourth algorithm in the second method executed by the controller with the third embodiment.

The fourth algorithm is illustrated in FIGS. 14 and 15. Some processes of the fourth algorithm are the same as those of the first algorithm and the second algorithm. Accordingly, the same processes as those in the first algorithm and the second algorithm will be numbered the same here, and will not be described and/or illustrated again in detail here for the sake of brevity. In addition, processes illustrated in FIG. 14 and processes illustrated in FIG. 15 are executed in parallel.

As seen in FIG. 14, after loading and unloading onto the second member 14 in this order (Steps S31 and S32), the seating detector 22 determines whether a current length of the electric seatpost assembly 210 is the minimum length L2 (Step S61). If the current length of the electric seatpost assembly 210 is the minimum length L2 (Yes in Step S61), Steps S36 and S37 are executed. Accordingly, the seating detector 22 is configured to transmit the extension signal CS1 to the controller 18 in response to detection of one of loading and unloading onto the second member 14. More specifically, the seating detector 22 is configured to transmit the extension signal CS1 to the controller 18 in response to detection of unloading onto the second member 14. The controller 18 is configured to control the positioning structure 16 to lengthen the length L of the electric seatpost assembly 210 in response to the extension signal CS1 in a state where the seating detector 22 detects the unloading. After Step S37 is finished or if the current length of the electric seatpost assembly 210 is the maximum length L1 (No in S61), the electric seatpost assembly 210 performs Step S31 again.

As seen in FIG. 15, after unloading and loading onto the second member 14 in this order (Steps S41 and S42), the seating detector 22 determines whether a current length of the electric seatpost assembly 210 is the maximum length L1 (Step S62). If the current length of the electric seatpost assembly 210 is the maximum length L1 (Yes in Step S62), Steps S34 and S35 are executed. Accordingly, the seating detector 22 is configured to transmit the retraction signal CS2 to the controller 18 in response to detection of one of loading and unloading onto the second member 14. More specifically, the seating detector 22 is configured to transmit the retraction signal CS2 to the controller 18 in response to detection of loading onto the second member 14. The controller 18 is configured to control the positioning structure 16 to shorten the length L of the electric seatpost assembly 210 in response to the retraction signal CS2. After Step S35 is finished or if the current length of the electric seatpost assembly 210 is the minimum length L2 (No in S62), the electric seatpost assembly 210 performs Step S31 again.

According to this algorithm, when the rider sits on the seat 6 of the electric seatpost assembly 210 having the maximum length L1, the rider needs to ride in the standing posture (Step S41) and sit on the seat 6 again (Step S42) to shorten the electric seatpost assembly 210. After the rider doing so, the retraction signal CS2 is transmitted to the controller 18 (Step S34), and the electric seatpost assembly 210 is shortened (Step S35). When the rider rides in the standing posture (Step S32) after the rider sits on the seat 6 of the electric seatpost assembly 210 having the minimum length L2 (Step S31), the extension signal CS1 is transmitted to the controller 18 (Step S36), and the electric seatpost assembly 210 is lengthened (Step S37).

In another situation, when the rider sits on the seat 6 of the electric seatpost assembly 210 having the maximum length L1 (Step S42) after the rider rides in the standing posture (Step S41), the retraction signal CS2 is transmitted to the controller 18 (Step S34), and the electric seatpost assembly 210 is shortened (Step S35). When the rider rides in the standing posture (Step S32) after the rider sits on the seat 6 of the electric seatpost assembly 210 having the minimum length L2 (Step S32), the extension signal CS1 is transmitted to the controller 18 (Step S36), and the electric seatpost assembly 210 is lengthened (Step S37).

With the electric seatpost assembly 210, it is possible to change the length L of the electric seatpost assembly 10 control the length L of the electric seatpost assembly 210 in accordance with information of the ride including at least one of a riding posture of a rider and a seat load applied to the seat 6 or the second member 14.

Modifications of Third Embodiment

In the third embodiment, examples to detect a riding posture from the output of the membrane switch 22a, the displacement sensor 22b, and the tact switch 22c are described. However, algorithms to detect the riding posture are not limited to those described in the third embodiment. For example, a center of balance of the weighted part of the seat 6 to which a load over a predetermined level is applied can be used to detect the riding posture.

In the first method, at least one of Steps S13 to S15 and Steps S16 to S17 can be omitted. In a case where Steps S13 to S17 are omitted, the controller 18 can lengthen the length L of the electric seatpost assembly 210 as soon as the controller 18 receives the extension signal CS1.

In the second method, the canceling signal CS6 can be transmitted to the controller 18 when the seating detector 22 detects a specific riding posture (e.g. the forward-bent sitting posture or the backward tilted posture). In this case, "loading onto the second member 14" means a riding posture different from the specific riding posture used for transmitting the canceling signal CS6. In addition, other riding postures (e.g. the forward-bent sitting posture or the backward tilted posture) can be used in place of unloading and loading onto the second member 14.

The seating detector 22 (the switch unit 220) can omit the processor PR1 and the memory M1 and transmit the output signal from at least one of the output of the membrane switch 22a, the displacement sensor 22b, and the tact switch 22c to the controller 18 directly. In this case, Steps S12, S14, S17, and S22 are replaced with transmitting an electric signal related to a riding posture. In addition, Steps S34, S36, and S44 can be omitted, and a process of transmitting an electric signal related to a riding posture is added to each of Step S31, S32, S41, S42, S43, and S45. Further, the current length of the electric seatpost assembly 210 can be managed by the controller 18 and the memory M2 can store the current length of the electric seatpost assembly 210.

Figure 16:
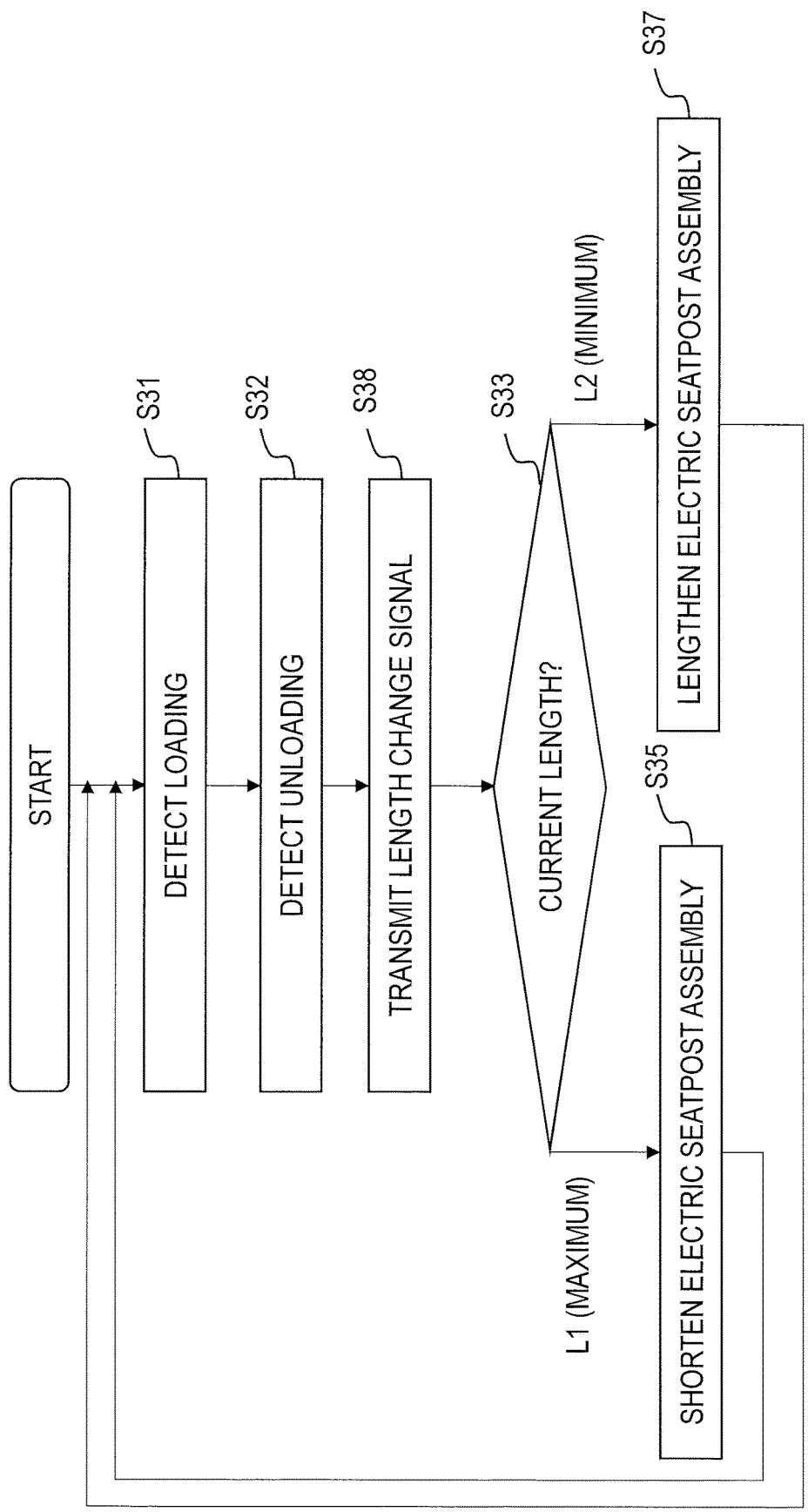
FIG. 16 illustrates a flow chart showing processes in a modification of the first algorithm in the second method executed by the controller with the third embodiment.

In place of the extension signal CS1 and the retraction signal CS2, the seating detector 22 (the switch unit 220) can transmit a length change signal CS7 to instruct the controller 18 to change the length L of the electric seatpost assembly 210. As seen in FIG. 16, the seating detector 22 can transmit the length change signal CS7 regardless of the current length of the electric seatpost assembly 210 (Step S38) after loading and unloading onto the second member 14 in this order (Steps S31 and S32). In this case, the current length of the electric seatpost assembly 210 is managed by the controller 18 and the memory M2 stores the current length of the electric seatpost assembly 210. The controller 18 is configured to shorten the length L of the electric seatpost assembly 210 (Step S35) when the current length stored in the memory M2 is the maximum length L1. The controller 18 is configured to lengthen the length L of the electric seatpost assembly 210 (Step S37) when the current length stored in the memory is M2 the minimum length L1.

As seen in FIG. 17, the seating detector 22 can transmit the length change signal CS7 regardless of the current length of the electric seatpost assembly 210 (Step S46) after unloading and loading onto the second member 14 in this order (Steps S41 and S42). In this case, the current length of the electric seatpost assembly 210 is managed by the controller 18 and the memory M2 stores the current length of the electric seatpost assembly 210. The controller 18 is configured to shorten the length L of the electric seatpost assembly 210 (Step S35) when the current length stored in the memory M2 is the maximum length L1. The controller 18 is configured to transmit a trigger request signal CS8 to the seating detector 22 (Step S47) when the current length stored in the memory M2 is the minimum length L2. If the seating detector 22 receives the trigger request signal CS8 and detects unloading onto the second member 14 (Yes in Step S43), the seating detector transmits the trigger signal CS5 to the controller 18 (Step S44). Even though the electric seatpost assembly 210 executes such algorithms, the electric seatpost assembly 210 has the same functions as those described in the third embodiment.

Other Modifications

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An electric seatpost assembly comprising:
a first member;
a second member movably coupled to the first member so as to change a length of the electric seat post assembly;
a positioning structure configured to position the second member relative to the first member;
a controller to control the positioning structure; and
a switch unit including a detector and provided on one of the first member and the second member to transmit at least one electric signal to the controller, the at least one electric signal including a signal to change the length of the electrical seat post assembly such that the length is changed by the positioning structure in accordance with a ride with respect to the second member which is detected by the detector.

2. The electric seatpost assembly according to claim 1, wherein
the switch unit is configured to continuously transmit the at least one electric signal while the switch unit is operated.

3. The electric seatpost assembly according to claim 1, wherein
the switch unit is configured to transmit the at least one electric signal for a predetermined transmission time period per one operation of the switch unit.

4. The electric seatpost assembly according to claim 1, wherein
the positioning structure includes an actuator to change a relative position between the first member and the second member, and
the controller is configured to control the positioning structure to move the actuator for a predetermined actuation time period in response to the at least one electric signal transmitted per one operation of the switch unit.

5. The electric seatpost assembly according to claim 1, wherein
the switch unit includes an operating member movable between a rest position and an operated position, the operating member being biased to the rest position.

6. The electric seatpost assembly according to claim 1, wherein
the detector includes a seating detector to detect a ride on the second member.

7. The electric seatpost assembly according to claim 6, wherein
the seating detector is configured to detect a riding posture on the second member to transmit the at least one electric signal, and
the controller is configured to control the positioning structure in response to the at least one electric signal.

8. The electric seatpost assembly according to claim 7, wherein
the at least one electric signal includes a retraction signal to shorten the length of the electric seatpost assembly, and
the seating detector is configured to transmit the retraction signal to the controller in response to detection of a third riding posture.

9. The electric seatpost assembly according to claim 7, wherein
the at least one electric signal includes an extension signal to lengthen the length of the electric seatpost assembly, and the seating detector is configured to transmit the extension signal to the controller in response to detection of a first riding posture.

10. The electric seatpost assembly according to claim 9, wherein
the at least one electric signal includes a trigger signal,
the seating detector is configured to transmit the trigger signal to the controller in response to detection of unloading onto the second member, and
the controller is configured to control the positioning structure to lengthen the length of the electric seatpost assembly in response to the trigger signal after receiving the extension signal.

11. The electric seatpost assembly according to claim 10, wherein
the at least one electric signal includes a canceling signal,
the seating detector is configured to transmit the canceling signal to the controller in response to detection of a second riding posture that is different from the first riding posture, and
the controller is configured to cancel a command based on the extension signal in response to the canceling signal before receiving the trigger signal.

12. The electric seatpost assembly according to claim 1, wherein
the positioning structure is configured to position the second member relative to the first member such that a predetermined first length and a predetermined second length different from the first length are realized as the length of the electric seat post assembly.

13. The electric seatpost assembly according to claim 1, wherein
the switch unit is configured to provide a click feeling when the switch unit is operated.

14. The electric seatpost assembly according to claim 1, wherein
the first member includes a first tube, and
the second member includes a second tube configured to be telescopically coupled to the first tube.

15. An electric seatpost assembly comprising:
a first member;
a second member movably coupled to the first member so as to change a length of the electric seat post assembly;
a positioning structure configured to position the second member relative to the first member;
a controller to control the positioning structure; and
a switch unit provided on one of the first member and the second member to transmit at least one electric signal to the controller, wherein
the switch unit including a seating detector to detect a ride on the second member,
the at least one electric signal includes an extension signal to lengthen the length of the electric seatpost assembly, and
the seating detector is configured to transmit the extension signal to the controller in response to detection of one of loading and unloading onto the second member.

16. The electric seatpost assembly according to claim 15, wherein
the controller is configured to control the positioning structure to lengthen the length of the electric seatpost assembly in response to the extension signal in a state where the seating detector detects the unloading.

17. An electric seatpost assembly comprising:
a first member;
a second member movably coupled to the first member so as to change a length of the electric seat post assembly;
a positioning structure configured to position the second member relative to the first member;
a controller to control the positioning structure; and
a switch unit provided on one of the first member and the second member to transmit at least one electric signal to the controller, wherein
the switch unit including a seating detector to detect a ride on the second member,
the at least one electric signal includes a retraction signal to shorten the length of the electric seatpost assembly,
the seating detector is configured to transmit the retraction signal to the controller in response to detection of one of loading and unloading onto the second member, and
the controller is configured to control the positioning structure to shorten the length of the electric seatpost assembly in response to the retraction signal.

* * * * *